(12) United States Patent
Narasaki et al.

(10) Patent No.: US 11,926,064 B2
(45) Date of Patent: Mar. 12, 2024

(54) REMOTE CONTROL MANIPULATOR SYSTEM AND REMOTE CONTROL ASSISTANCE SYSTEM

(71) Applicant: Mitsubishi Electric Corporation, Tokyo (JP)

(72) Inventors: Shota Narasaki, Tokyo (JP); Noboru Kawaguchi, Tokyo (JP); Masaki Hirano, Tokyo (JP); Muneharu Kuwata, Tokyo (JP); Masashige Suwa, Tokyo (JP); Toshiyuki Ando, Tokyo (JP); Hitomi Ono, Tokyo (JP); Akihiro Fujie, Tokyo (JP); Yoshitaka Koda, Tokyo (JP); Toru Sato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/265,269

(22) PCT Filed: Dec. 10, 2021

(86) PCT No.: PCT/JP2021/045527
§ 371 (c)(1),
(2) Date: Jun. 5, 2023

(87) PCT Pub. No.: WO2022/124398
PCT Pub. Date: Jun. 16, 2022

(65) Prior Publication Data
US 2024/0033930 A1     Feb. 1, 2024

(30) Foreign Application Priority Data
Dec. 10, 2020 (JP) ................ 2020-205183

(51) Int. Cl.
*G06F 17/00* (2019.01)
*B25J 9/16* (2006.01)
(Continued)

(52) U.S. Cl.
CPC ............. *B25J 9/1689* (2013.01); *G06T 17/00* (2013.01); *H04N 13/117* (2018.05);
(Continued)

(58) Field of Classification Search
CPC ...... B25J 9/1689; G06T 17/00; H04N 13/117; H04N 13/239; H04N 13/332; H04N 13/38; H04N 13/398
(Continued)

(56) References Cited

U.S. PATENT DOCUMENTS 5,510,832 A * 4/1996 Garcia ................ H04N 13/261
348/E13.058
5,684,531 A    11/1997 Li et al.
(Continued)

FOREIGN PATENT DOCUMENTS

JP    S60-077589 A    5/1985
JP    2000-042960 A   2/2000
(Continued)

OTHER PUBLICATIONS

Advanced User Interfaces for Teleoperated Surgical Robotic Systems (Year: 2023).*
(Continued)

*Primary Examiner* — Ronnie M Mancho
(74) *Attorney, Agent, or Firm* — XSENSUS LLP

(57) ABSTRACT

A remote control manipulator system includes: a manipulator being controlled by an operator remotely to handle an object; a stereoscopic display device that displays a right-eye image and a left-eye image so as to be stereoscopically viewed; a model image generator that generates a model image being an image of an integrated three-dimensional model viewed from a viewpoint designated by the operator, the integrated three-dimensional model being a three-dimensional model obtained by integrating the manipulator model
(Continued)

and a surrounding environment model being generated by performing image processing on the right-eye image and the left-eye image and being a three-dimensional model of the object and a surrounding environment thereof; and a model image display device that displays the model image and is configured to be able to be viewed by the operator switching between the stereoscopic display device and the model image display device through moving the head of the operator.

27 Claims, 22 Drawing Sheets

(51) Int. Cl.
G06T 17/00 (2006.01)
H04N 13/117 (2018.01)
H04N 13/239 (2018.01)
H04N 13/332 (2018.01)
H04N 13/38 (2018.01)
H04N 13/398 (2018.01)

(52) U.S. Cl.
CPC ......... *H04N 13/239* (2018.05); *H04N 13/332* (2018.05); *H04N 13/38* (2018.05); *H04N 13/398* (2018.05)

(58) Field of Classification Search
USPC .......................................................... 700/264
See application file for complete search history.

(56) References Cited

U.S. PATENT DOCUMENTS

| | | | | |
|---|---|---|---|---|
| 5,726,704 A * | 3/1998 | Uomori | ................ | H04N 13/239 348/E13.052 |
| 5,801,760 A * | 9/1998 | Uomori | ................ | H04N 13/376 348/E13.067 |
| 7,236,854 B2 * | 6/2007 | Pretlove | ................. | G05B 19/42 318/568.22 |
| 7,714,895 B2 * | 5/2010 | Pretlove | ................. | G06F 3/1454 348/222.1 |
| 8,036,775 B2 * | 10/2011 | Matsumoto | ............. | G06N 3/008 700/255 |
| 8,041,459 B2 * | 10/2011 | Sutherland | ............. | A61B 90/25 600/407 |
| 8,123,675 B2 * | 2/2012 | Funda | .............. | A61B 1/000094 600/114 |
| 8,170,717 B2 * | 5/2012 | Sutherland | ............. | A61B 34/35 901/14 |
| 8,648,797 B2 * | 2/2014 | Nagasaka | ................ | G06F 3/014 345/157 |
| 8,880,223 B2 * | 11/2014 | Raj | ........................ | A61B 90/00 700/250 |
| 9,220,567 B2 * | 12/2015 | Sutherland | ............. | A61B 34/70 |
| 9,285,586 B2 * | 3/2016 | Hunt | .................. | G02B 27/0093 |
| 10,078,712 B2 * | 9/2018 | Bacon | ..................... | G06F 30/20 |
| 10,203,762 B2 * | 2/2019 | Bradski | ................ | H04N 21/414 |
| 10,471,594 B2 * | 11/2019 | Bergstra | ................ | B25J 9/1656 |
| 10,768,708 B1 * | 9/2020 | Sills | ........................ | B25J 13/00 |
| 10,846,942 B1 * | 11/2020 | Horowitz | ................ | G06T 7/136 |
| 11,262,887 B2 * | 3/2022 | Petersen | ............... | G06F 3/0482 |
| 11,491,661 B2 * | 11/2022 | Yamamoto | ........... | G05D 1/0016 |
| 11,612,307 B2 * | 3/2023 | Smith | ................ | A61B 1/00193 348/48 |
| 11,706,396 B2 * | 7/2023 | Yoshida | ............... | H04N 13/398 348/43 |
| 11,747,357 B2 * | 9/2023 | Leboudec | .......... | G01N 35/1072 422/509 |
| 2012/0306860 A1 * | 12/2012 | Hatta | ................... | H04N 13/366 345/419 |
| 2013/0187961 A1 * | 7/2013 | Hunt | .................... | H04N 13/398 345/697 |
| 2013/0229711 A1 * | 9/2013 | Kato | ...................... | G02B 30/00 359/464 |
| 2015/0312546 A1 * | 10/2015 | Hasegawa | ........... | H04N 13/373 348/59 |
| 2017/0143442 A1 * | 5/2017 | Tesar | ..................... | H04N 23/63 |
| 2017/0230644 A1 * | 8/2017 | Takizawa | ............. | H04N 13/327 |
| 2018/0236666 A1 | 8/2018 | Mozeika et al. | | |
| 2019/0274776 A1 * | 9/2019 | Ramirez Luna | ....... | G03B 35/10 |
| 2019/0289284 A1 * | 9/2019 | Smith | ................ | A61B 1/00193 |
| 2020/0134927 A1 * | 4/2020 | Huang | ................... | G02B 30/22 |
| 2020/0215691 A1 | 7/2020 | Saruta et al. | | |
| 2021/0096351 A1 * | 4/2021 | Mizoguchi | .......... | G02B 23/243 |
| 2021/0187751 A1 | 6/2021 | Maeda et al. | | |
| 2021/0323165 A1 | 10/2021 | Kamon et al. | | |
| 2021/0327121 A1 * | 10/2021 | Kongsilp | ................ | G06T 13/40 |
| 2023/0222740 A1 * | 7/2023 | Katsuki | ............... | H04N 13/275 345/419 |

FOREIGN PATENT DOCUMENTS

| | | |
|---|---|---|
| JP | 2009-006410 A | 1/2009 |
| JP | 2009-012106 A | 1/2009 |
| JP | 2010-094777 A | 4/2010 |
| JP | 2014-056496 A | 3/2014 |
| JP | 2020-037145 A | 3/2020 |
| JP | 2020-040184 A | 3/2020 |
| WO | 2019/059364 A1 | 3/2019 |
| WO | 2021/220915 A1 | 11/2021 |

OTHER PUBLICATIONS

Medical telerobotic systems: current status and future trends (Year: 2004).*
Decision to Grant a Patent dated Jan. 10, 2023 in Japanese Patent Application No. 2022-568347 and machine English translation thereof, 4 pages.
"Development of the waste separation sorting system by a next-generation manipulator—The 3rd news: a final outcome report", 29th Annual Conference of the Robotics Society of Japan, Sep. 7, 2011, and machine English translation thereof, 9 pages.

* cited by examiner

REMOTE CONTROL MANIPULATOR SYSTEM AND REMOTE CONTROL ASSISTANCE SYSTEM

CROSS-REFERENCE TO RELATED APPLICATIONS

The present application is based on PCT filing PCT/JP2021/045527, filed Dec. 10, 2021, which claims priority from JP 2020-205183, filed Dec. 10, 2020, the entire contents of each are incorporated herein by reference.

TECHNICAL FIELD

The present disclosure relates to a remote control manipulator system that controls a manipulator remotely and a remote control assistance system that assists remote control of the manipulator.

BACKGROUND ART

A remote operation assistance device that assists remote operation of a manipulator, a robot, or the like has been proposed (see PTL 1). The remote operation assistance device generates a three-dimensional model of an object handled by the robot and a three-dimensional model of the robot, generates an image in which the robot and the object viewed from a designated viewpoint in a three-dimensional space are displayed, and presents the image to an operator. The three-dimensional model of the object is generated from point group data on an object 11 measured by a laser scanner 13. The three-dimensional model of the robot is generated by reflecting an operation state of a robot 12 based on a state 19 of each axis of the robot 12.

In order to control the robot and the manipulator remotely, there is a system in which the operator wears a head mount display (HMD) that is a display device worn on the head so as to cover both eyes (see PTL 2).

CITATION LIST

Patent Literatures

PTL 1: Japanese Patent Laid-Open No. 2009-006410 PTL 2: WO 2019/059364

SUMMARY OF INVENTION

Technical Problem

A camera and various sensors are mounted on the robot. An image captured by the camera or sensor information detected by various sensors are displayed on a display. The operator operates the robot while viewing the image and sensor information displayed on the display. The operator wears the HMD so as to be able to view a stereoscopic image (also referred to as a 3D-image) that can also be recognized perspective easily. When the operator wears the HMD on the head, there is a problem that information that can be viewed by the operator is limited to information provided through the HMD.

For example, when the operator wears the HMD in a case where an image (hereinafter, referred to as a robot visual field image) of a visual field of a camera mounted on the robot is stereoscopically viewed, there are the following problems. When the robot visual field image is always displayed regardless of an orientation of a face of the operator, it is difficult for the operator to view information other than the robot visual field image (position information and posture information about the robot, surrounding environment information, and the like are called control reference information). When the 3D-image and the control reference information are superimposed and provided on the HMD, a display size and the information amount of the control reference information are limited, and the image is difficult to view because the 3D-image and other information are superimposed.

It is considered a case of displaying a different viewpoint image, in which an object is viewed from a viewpoint different from the viewpoint of the camera, on the HMD as the control reference information. The operator is required to input whether to display the robot visual field image or the different viewpoint image on the HMD, which becomes a burden on the operator. The display system is also required to be able to cope with a display image switching instruction inputted by the operator, which complicates the system.

An object of the present disclosure is to provide a remote control manipulator system and a remote control assistance system that enable the operator to switch and view easily the stereoscopic image viewing stereoscopically an object handled by the manipulator and a model image viewing a surrounding environment and the manipulator from an arbitrary viewpoint through moving the head of the operator. The surrounding environment includes the object handled by the manipulator and a thing that is present around the object.

Solution to Problem

A remote control manipulator system according to the present disclosure includes: a manipulator controlled by an operator remotely to handle an object; an operation instruction inputter through which the operator inputs an operation instruction instructing an operation of the manipulator to move or to be still; a control signal generator to generate a control signal controlling the manipulator from the operation instruction; a right camera and a left camera mounted on the manipulator, the right camera and the left camera having a predetermined positional relationship; a stereoscopic display device to display a right-eye image captured by the right camera and a left-eye image captured by the left camera to be viewed stereoscopically; a position and posture sensor to detect position and posture information representing a position and a posture of the manipulator; a structure data storage to store manipulator structure data representing a structure of the manipulator and camera structure data representing structures of the right camera and the left camera; a manipulator model generator to generate a manipulator model that is a three-dimensional model of the manipulator including the right camera and the left camera by referring to the manipulator structure data, the camera structure data, and the position and posture information; an image processing model generator to perform image processing on the right-eye image and the left-eye image based on positions and capturing directions of the right camera and the left camera included in the manipulator model to generate a surrounding environment model that is a three-dimensional model of the object and a surrounding environment being a thing being present around the object; a model integrator to generate an integrated three-dimensional model that is a three-dimensional model obtained by integrating the surrounding environment model and the manipulator model; a model image generator to generate a model image that is an image of the integrated three-dimensional model viewed from a viewpoint designated by the operator;

and a model image display device to display the model image and configure to be able to be viewed by the operator switching between the stereoscopic display device and the model image display device through moving the head of the operator.

A remote control assistance system according to the present disclosure includes: a stereoscopic display device to display a right-eye image and a left-eye image captured by a right camera and a left camera to be viewed stereoscopically, the right camera and the left camera being mounted on a manipulator controlled remotely by an operator to handle an object and having a predetermined positional relationship; a structure data storage to store manipulator structure data representing a structure of the manipulator and camera structure data representing structures of the right camera and the left camera; a manipulator model generator to generate a manipulator model that is a three-dimensional model of the manipulator including the right camera and the left camera by referring to the manipulator structure data, the camera structure data, and position and posture information representing a position and a posture of the manipulator; an image processing model generator to perform image processing on the right-eye image and the left-eye image based on positions and capturing directions of the right camera and the left camera included in the manipulator model to generate a surrounding environment model that is a three-dimensional model of the object and a surrounding environment being a thing being present around the object; a model integrator to generate an integrated three-dimensional model that is a three-dimensional model obtained by integrating the surrounding environment model and the manipulator model; a model image generator to generate a model image that is an image of the integrated three-dimensional model viewed from a viewpoint designated by the operator; and a model image display device to display the model image and configure to be able to be viewed by the operator switching between the stereoscopic display device and the model image display device through moving the head of the operator.

Advantageous Effects of Invention

According to the present disclosure, the operator can view easily while switching between the stereoscopic image viewing stereoscopically the object handled by the manipulator and the model image viewing the object and the surrounding environment that is the thing that is present around the object and the manipulator from an arbitrary viewpoint through moving the head of the operator.

DESCRIPTION OF EMBODIMENTS

First Embodiment

Figure 1:
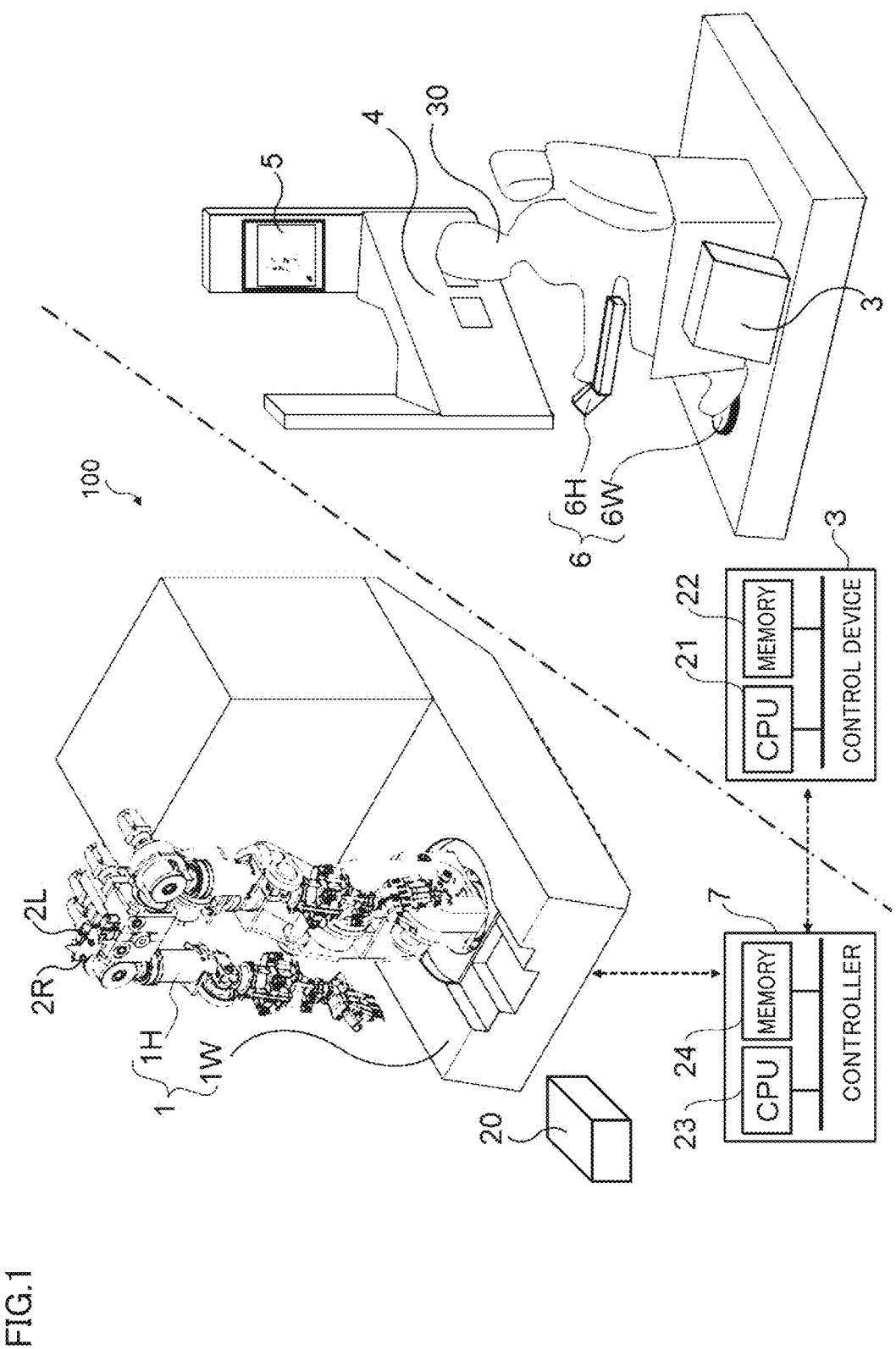
FIG. 1 is a view illustrating a schematic configuration of a remote control manipulator system according to a first embodiment.
Figure 2:
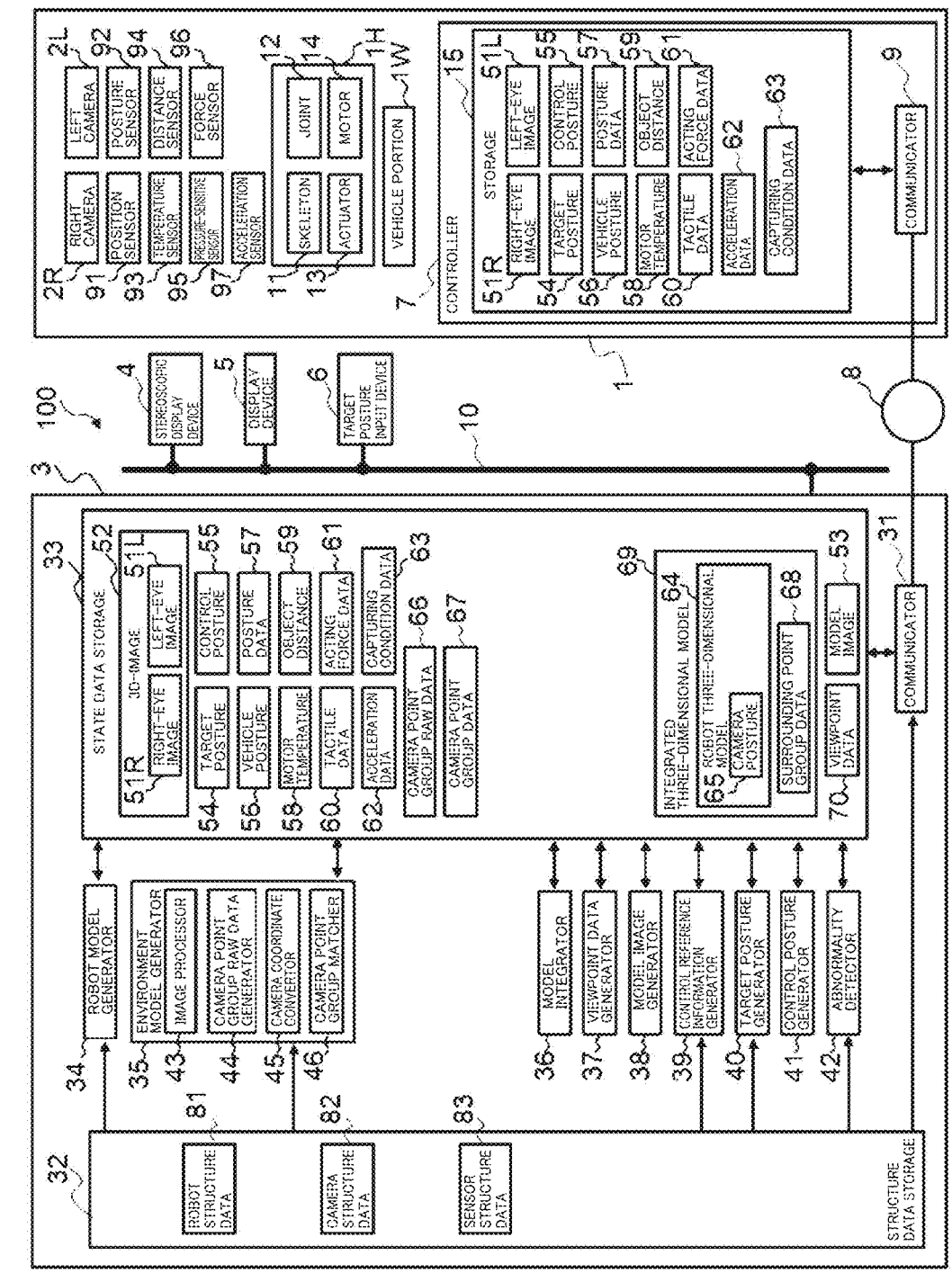
FIG. 2 is a block diagram illustrating a functional configuration of the remote control manipulator system of the first embodiment.

With reference to FIGS. 1 and 2, a schematic configuration of a remote control manipulator system 100 is described. FIG. 1 is a view illustrating a schematic configuration of a remote control manipulator system according to a first embodiment. FIG. 2 is a block diagram illustrating a functional configuration of the remote control manipulator system of the first embodiment. Remote control manipulator system 100 includes mainly a crawler mobile robot 1 (abbreviated as robot 1), a right camera 2R, a left camera 2L, a control device 3, a stereoscopic display device 4, a display device 5, and a target posture input device 6. Robot 1 is a manipulator that is controlled remotely by operator 30 to handle an object 20. A place where robot 1 handles object is called a site. The place where an operator 30 works is called an operation center. Operator 30 is an operator who controls the manipulator remotely.

Right camera 2R and left camera 2L are mounted on a head included in robot 1 and capture images. Control device 3 controls robot 1. Stereoscopic display device 4 stereoscopically displays images captured by right camera 2R and left camera 2L. The stereoscopically displaying means that displaying is performed so as to be viewed stereoscopically. Display device 5 displays an image of robot 1 and a three-dimensional model of the surrounding environment viewed from an arbitrary viewpoint, and information required or useful for controlling robot 1. The surrounding environment is object 20 and a thing that is present around object 20. The three-dimensional model of the surrounding environment is a surrounding environment model. When operator 30 operates robot 1, operator 30 inputs a target posture representing a target position and posture to be taken after the operation through target posture input device 6. The target posture is an operation instruction in which operator 30 instructs an operation in which robot 1 moves or stands still. The target posture represents the position and posture of robot 1 to be taken after execution of the operation according to the operation instruction. Target posture input device 6 is the operation instruction inputter through which operator 30 inputs the operation instruction.

Figure 3:
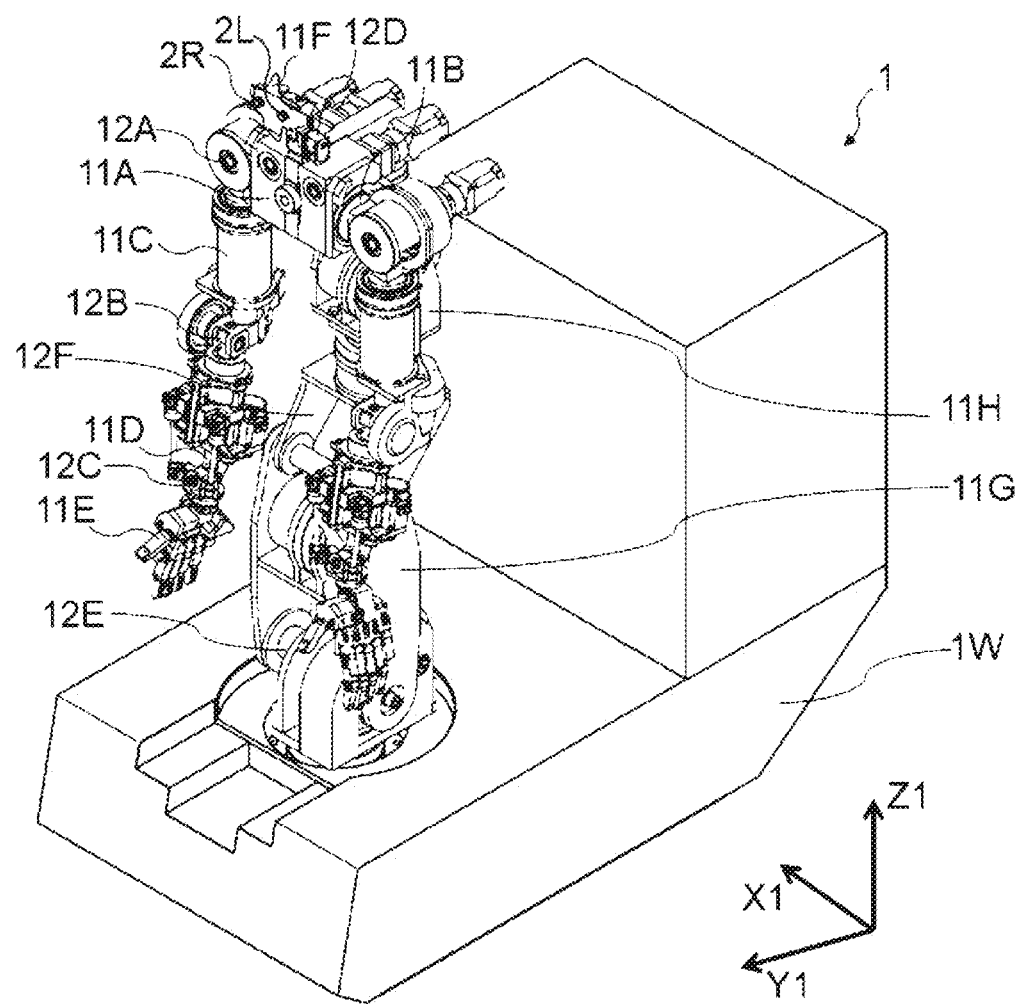
FIG. 3 is a perspective view illustrating a robot used in the remote control manipulator system of the first embodiment.
Figure 4:
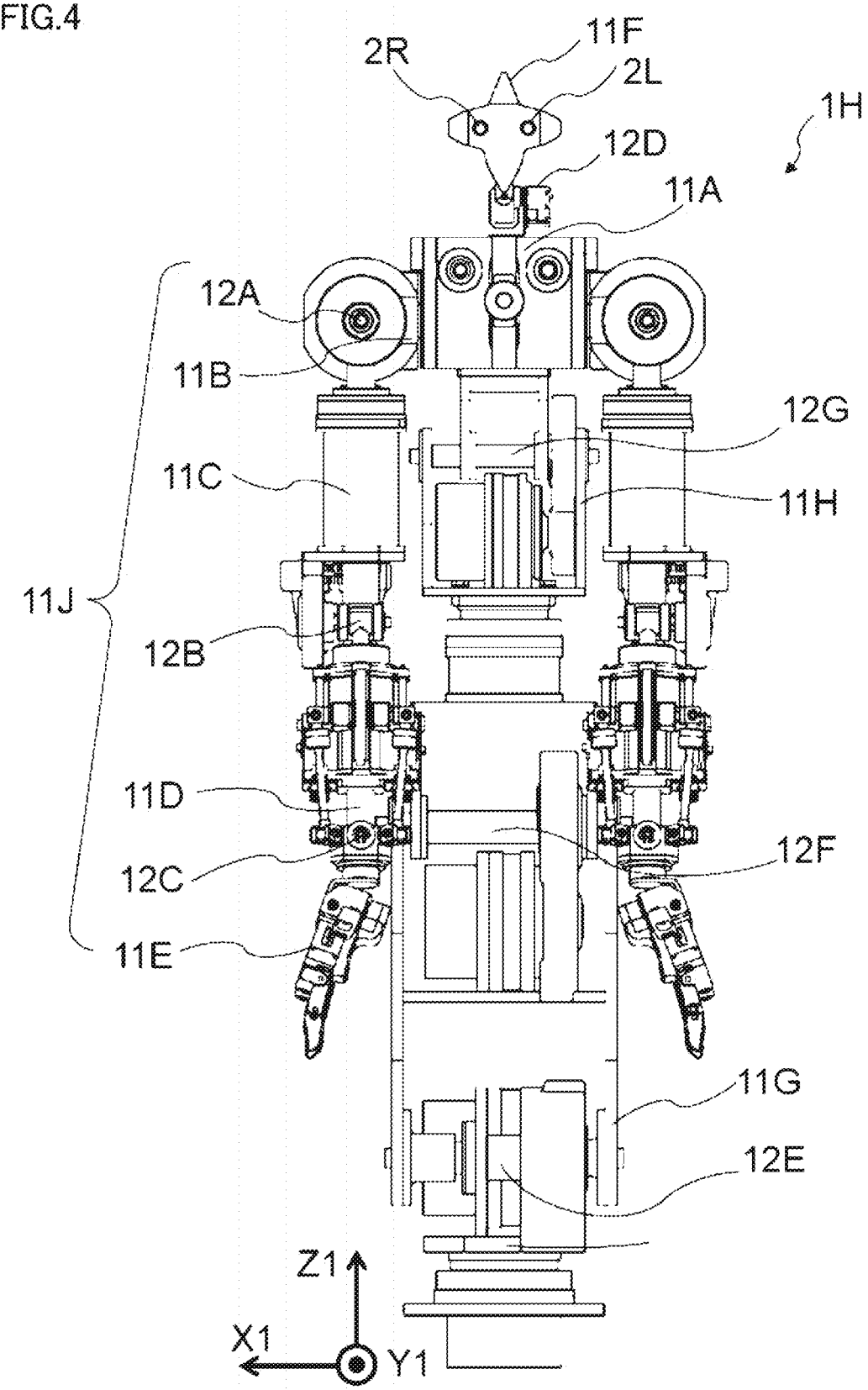
FIG. 4 is a front view illustrating a humanoid included in the robot used in the remote control manipulator system of the first embodiment.
Figure 5:
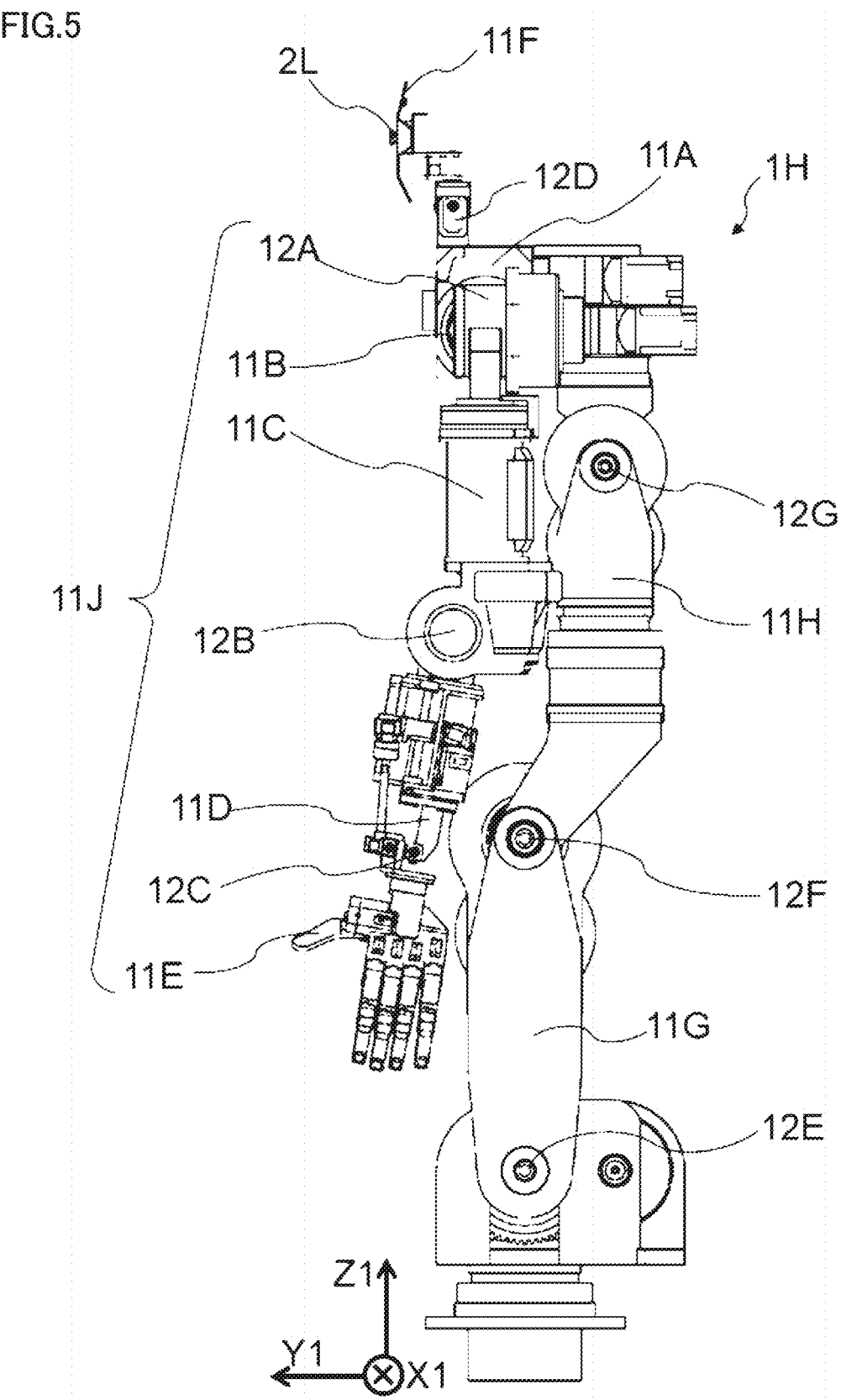
FIG. 5 is a left side view illustrating the humanoid included in the robot used in the remote control manipulator system of the first embodiment.

The robot being a target to be controlled remotely is robot 1 in FIGS. 3 to 5. The remote control manipulator system can also control a robot different from robot 1 remotely. FIG. 3 is a perspective view illustrating the robot used in the remote control manipulator system of the first embodiment. FIG. 4 is a front view illustrating a humanoid included in the robot used in the remote control manipulator system of the first embodiment. FIG. 5 is a left side view of the humanoid. Robot 1 includes a vehicle portion 1W, a humanoid 1H, and a controller 7. Vehicle portion 1W is a vehicle that moves by rotating crawlers (caterpillars) with wheels. Humanoid 1H is mounted on a front upper surface of vehicle portion 1W. Humanoid 1H includes two arms, a body, and a head. Controller 7 controls vehicle portion 1W and humanoid 1H. A state in which robot 1 takes the posture in FIGS. 3 to 5 is referred to as a reference state of robot 1.

An XYZ-coordinate system is a coordinate system representing a space in which robot 1 is present. An XY-plane is a horizontal plane. The XYZ-coordinate system is also referred to as a site coordinate system. An X-axis is parallel to an east-west direction, and a Y-axis is parallel to a north-south direction. The east is a positive direction of the X-axis, and the north is a positive direction of the Y-axis. A Z-axis is an axis in a height direction. An upper side is defined as a positive direction of the Z-axis. A position sensor 91 measures the position and posture of vehicle portion 1W in the XYZ-coordinate system. The position of vehicle portion 1W is the position of the gravity center of vehicle portion 1W in the XYZ-coordinate system. The posture of vehicle portion 1W is a direction to which the front of vehicle portion 1W is directed. The posture of vehicle portion 1W is expressed by a yaw angle, a pitch angle, and a roll angle. Data representing the position and posture of vehicle portion 1W is referred to as a vehicle posture 56.

In order to express the posture of vehicle portion 1W, a first orthogonal coordinate system (X1Y1Z1-coordinate system) that moves together with vehicle portion 1W is defined as follows. The first orthogonal coordinate system is also used to express the posture of humanoid 1H with respect to vehicle portion 1W. The upper surface of vehicle portion 1W is referred to as a robot reference plane.

- X1 axis: an axis parallel to a right-left direction of vehicle portion 1W.
- Y1 axis: an axis parallel to the front-rear direction of vehicle portion 1W.
- Z1 axis: an axis parallel to the height direction of vehicle portion 1W.

The X1-axis, the Y1-axis, and the Z1-axis are orthogonal to each other. The right side is defined as the positive direction of the X1-axis, the front side is defined as the positive direction of the Y1-axis, and the upper side is defined as the positive direction of the Z1-axis. The X1-axis and the Y1-axis are parallel to the robot reference plane. The posture of vehicle portion 1W is expressed by directions to which the X1-axis, the Y1-axis, and the Z1-axis are directed in the XYZ-coordinate system. The yaw angle is an angle formed by the X-axis and an axis (projection Y1-axis) obtained by projecting the Y1-axis onto the XY-plane. The pitch angle is an angle formed by the Y1-axis and the XY-plane. The roll angle is an angle formed by a plane including the projection Y1-axis and the Z-axis and the Z1-axis.

Target posture input device 6 includes an upper body target posture inputter 6H used for controlling humanoid 1H and a vehicle posture inputter 6W used for controlling vehicle portion 1W. Upper body target posture inputter 6H is a device through which operator 30 inputs the target posture with respect to humanoid 1H using a hand. Vehicle posture inputter 6W is a device through which operator 30 steers vehicle portion 1W using a foot. The target posture is a posture to be taken by robot 1 including humanoid 1H. The target posture is inputted as a target posture of the posture of robot 1. Data representing the inputted target posture is referred to as a target posture 54. Operator 50 can input the target posture and operator 30 can change the inputted target posture.

In humanoid 1H, a skeleton 11 is connected rotatably by a joint 12. Target posture 54 is expressed as a command value for the rotation angle around each rotation axis of each joint 12. When each joint 12 takes the angle instructed by target posture 54, humanoid 1H takes target posture 54. When the humanoid includes a portion in which the length is changeable, the target posture also includes a command value for the length of the portion in which the length is changeable. The structure of humanoid 1H is described later.

Upper body target posture inputter 6H is a device that is used to input target posture 54 that is a command value designating the angle of each rotation axis of each joint 12. In upper body target posture inputter 6H, for example, operator 30 operates a lever or the like to input target posture 54.

Operator 30 operates vehicle posture inputter 6W with the foot to input instructions of forward movement, backward movement, right rotation, and left rotation of vehicle portion 1W. Vehicle portion 1W is moved according to the instruction inputted by operator 30. When the position and the yaw angle of vehicle portion 1W become those intended by operator 30, the input of vehicle posture 56 is ended. The pitch angle and the roll angle of vehicle portion 1W are determined by the shapes of the ground, buildings, and the like existing under the crawlers of vehicle portion 1W. The vehicle portion may include a mechanism that changes at least one of the pitch angle and the roll angle. In this case, operator 30 also inputs a command value for the mechanism that changes at least one of the pitch angle and the roll angle by the vehicle posture inputter.

Right camera 2R and left camera 2L are mounted on a head 11F included in robot 1. Right camera 2R and left camera 2L have a predetermined positional relationship. For example, right camera 2R and left camera 2L are disposed at predetermined intervals at predetermined positions at the same height above the front side of head 11F. Right camera 2R and left camera 2L capture images of the situation in which hand 11E included in robot 1 handles object 20 that is the operation target. Right camera 2R and left camera 2L are mounted on head 11F included in robot 1 such that the images similar to those viewed by a human when the human handles object 20 can be captured. Right camera 2R captures a right-eye image 51R. Left camera 2L captures a left-eye image 51L. The visual field viewed from the positions of right camera 2R and left camera 2L is referred to as a robot visual field.

Right-eye image 51R and left-eye image 51L are displayed so as to be viewed stereoscopically by stereoscopic display device 4. The displaying an object to be viewed stereoscopically is referred to as stereoscopically displaying. Right-eye image 51R and left-eye image 51L that are stereoscopically displayed are referred to as a 3D-image 52. Stereoscopic display device 4 includes two eyepieces disposed at a predetermined interval. Operator 30 can view 3D-image 52 displayed to be viewed stereoscopically by looking into the eyepiece of stereoscopic display device 4 with the right eye and the left eye.

Stereoscopic display device 4 includes a right-eye screen displaying right-eye image 51R and a left-eye screen displaying left-eye image 51L. The positions and intervals of the right-eye screen and the left-eye screen and the optical system such as the eyepiece are designed such that the distance to object 20 and the surrounding environment, the size of object 20, and the like are similar to those viewed when operator 30 is at the site. That is, a convergence angle in stereoscopic display device 4 is the same as convergence angles of right camera 2R and left camera 2L, which are the two cameras mounted on robot 1. Stereoscopic display device 4 enables operator 30 to view a natural stereoscopic image. Therefore, operator 30 can recognize an accurate depth feeling with respect to object 20.

Stereoscopic display device 4 may not include the eyepiece, but may use a liquid crystal shutter, polarizing glasses, or the like. Stereoscopic display device 4 may be any device as long as the device performs the stereoscopically displaying.

Display device 5 displays a model image 53. Model image 53 is an image of robot 1 and the surrounding environment viewed from an arbitrary viewpoint based on the three-dimensional model of the surrounding environment including object 20 and robot 1. The viewpoint of model image 53 is determined based on information inputted by operator 30. Information useful for controlling robot 1 remotely is displayed on display device 5. The information useful for controlling robot 1 remotely is referred to as control reference information. A plurality of display devices 5 may be provided.

In the example shown in FIG. 1, operator 30 sits on a chair, box-shaped stereoscopic display device 4 is provided in front of the head of operator 30, and display device 5 is provided on the upper right side of stereoscopic display device 4. Stereoscopic display device 4 and display device 5 may be disposed in any posture as long as operator 30 can select and view either of display devices through moving the head. Display device 5 may include a large screen or may project the image on the screen with a projector. Display device 5 may be disposed such that operator 30 can view display device 5 switched from stereoscopic display device 4 through moving the head.

Operator 30 can stereoscopically view object 20 and the like in the robot visual field by looking into the eyepiece of stereoscopic display device 4. Operator 30 can view model image 53 on display device 5 by changing the position and orientation of the head.

Control device 3 controls robot 1 remotely. Control device 3 is implemented by a computer including a CPU 21 and a memory 22. Memory 22 stores a program executed by CPU 21, data used for processing, data obtained as a result of processing, and the like. Memory 22 is a semiconductor memory such as a flash memory, and a hard disk. Memory 22 includes a volatile storage device and a non-volatile storage device. Controller 7 is implemented by a computer including CPU 23 and a memory 24.

Robot 1 and control device 3 are connected to each other through a communication line 8, and communicate with each other. A control signal controlling robot 1 is sent from control device 3 through communication line 8. The control signal is a signal that sends target posture 54 and a control posture 55 to controller 7. Control posture 55 is data representing the posture of robot 1 in the process in which robot 1 takes the posture expressed by target posture 54. Control posture 55 is data representing the posture to be taken by robot 1 at the end of a period which is used to control robot 1. Control posture 55 is expressed in the same format as target posture 54. Target posture 54 and control posture 55 are calculated periodically by control device 3, and sent to controller 7 as soon as each of target posture 54 and control posture 55 is calculated. From robot 1, right-eye image 51R, left-eye image 51L, and sensor information detected by various sensors mounted on robot 1 are sent to control device 3. Right-eye image 51R and left-eye image 51L are also sent to stereoscopic display device 4.

Controller 7 includes a communicator 9 in order to communicate with control device 3. Communication line 8 may be a wired line or a wireless line, and may be a public line or a dedicated line. The communication line suitable for application is used. A distance between the site where robot 1 operates object 20 and an operation center where operator 30 works is arbitrary. The distance may be thousands of kilometers or 1 meter. Control device 3 is installed in a building where the operation center is located. Control device 3 may be installed in another building. Stereoscopic display device 4, display device 5, upper body target posture inputter 6H, and vehicle posture inputter 6W and control device 3 are connected by a LAN 10. The remote control means that the control is performed by a method for controlling a machine remotely. The actual distance between the machine such as robot 1 and control device 3 may not be remote.

Humanoid 1H includes mainly skeleton 11, joint 12, an actuator 13, and a motor 14. Skeleton 11 is a member constituting each portion of humanoid 1H. Joint 12 is connected to skeleton 11 such that a connection angle is changeable. Actuator 13 and motor 14 generate force moving joint 12.

Skeleton 11 is any one of a body 11A, an arm base 11B, an upper arm 11C, a forearm 11D, hand 11E, head 11F, a leg 11G, and a body connection portion 11H. Upper arm 11C, forearm 11D, and hand 11E correspond to an upper arm, a forearm, and a hand of a human, respectively. Hand 11E has a shape similar to that of a human hand and has five fingers. Leg 11G and body connection portion 11H correspond to a lower body in the human. Leg 11G and body connection portion 11H exist in series between vehicle portion 1W and body 11A. Leg 11G is connected to vehicle portion 1W. Body connection portion 11H is connected to body 11A and leg 11G. When leg 11G and body connection portion 11H move, the position and angle of body 11A with respect to vehicle portion 1W change.

An arm 11J is composed of arm base 11B, upper arm 11C, forearm 11D, and hand 11E. Arm base 11B is connected to the left and right of the upper portion of body 11A. Arm base 11B, upper arm 11C, forearm 11D, and hand 11E are connected in series. Arm base 11B enables arm 11J to be rotated around the rotation axis perpendicular to the side surface of body 11A.

Joint 12 is any one of a shoulder joint 12A, an elbow joint 12B, a wrist joint 12C, a neck joint 12D, a leg base joint 12E, a leg tip joint 12F, and a body joint 12G. Shoulder joint 12A, elbow joint 12B, and wrist joint 12C correspond to a shoulder joint, an elbow joint, and a wrist joint of a human, respectively. Neck joint 12D connects head 11F to body 11A rotatably. Leg base joint 12E and leg tip joint 12F are joints 12 existing on the root side and the tip side of leg 11G, respectively. Body joint 12G connects body 11A to body connection portion 11H rotatably.

Figure 6:
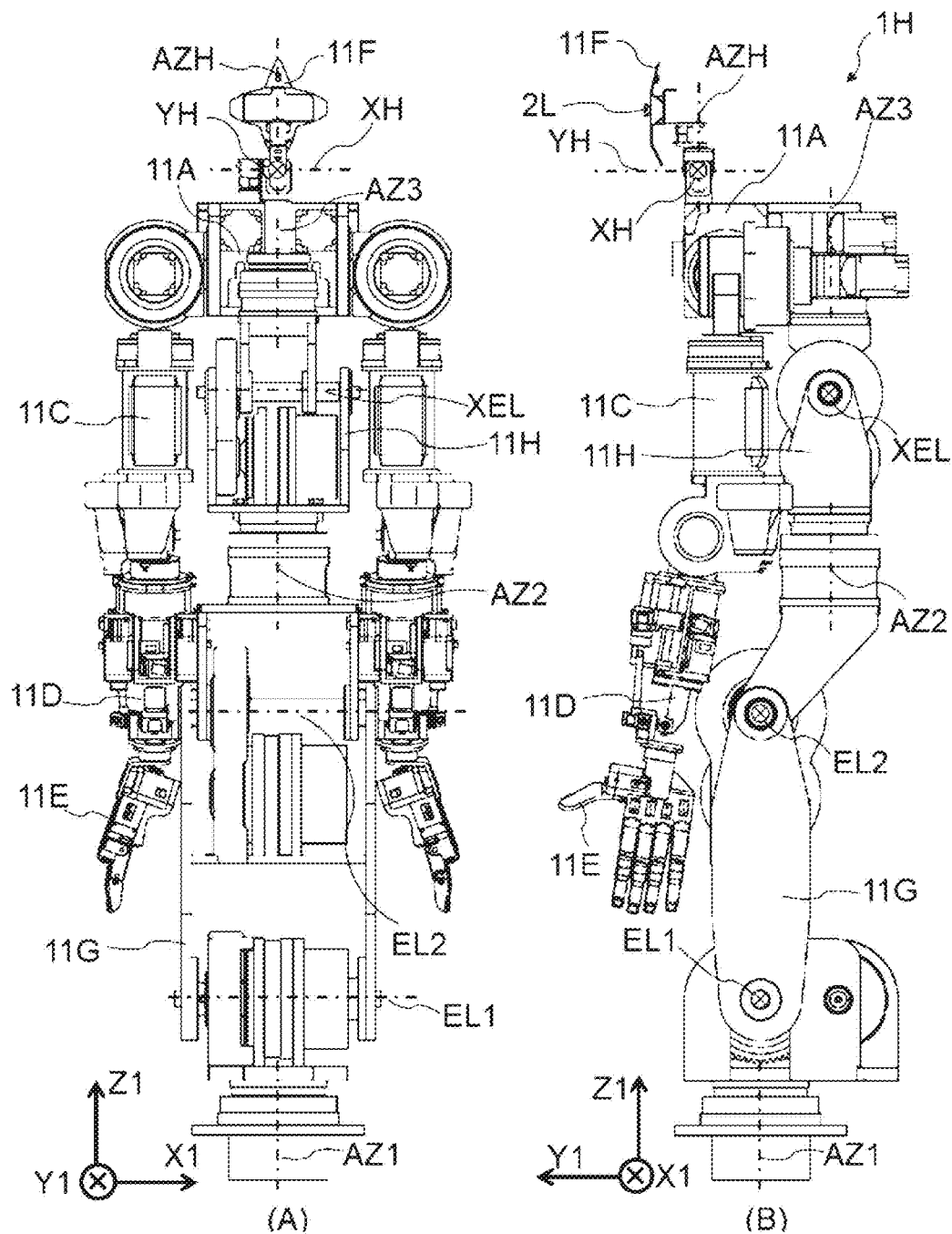
FIG. 6 is a view illustrating a rotation axis included in the robot used in the remote control manipulator system of the first embodiment.
Figure 7:
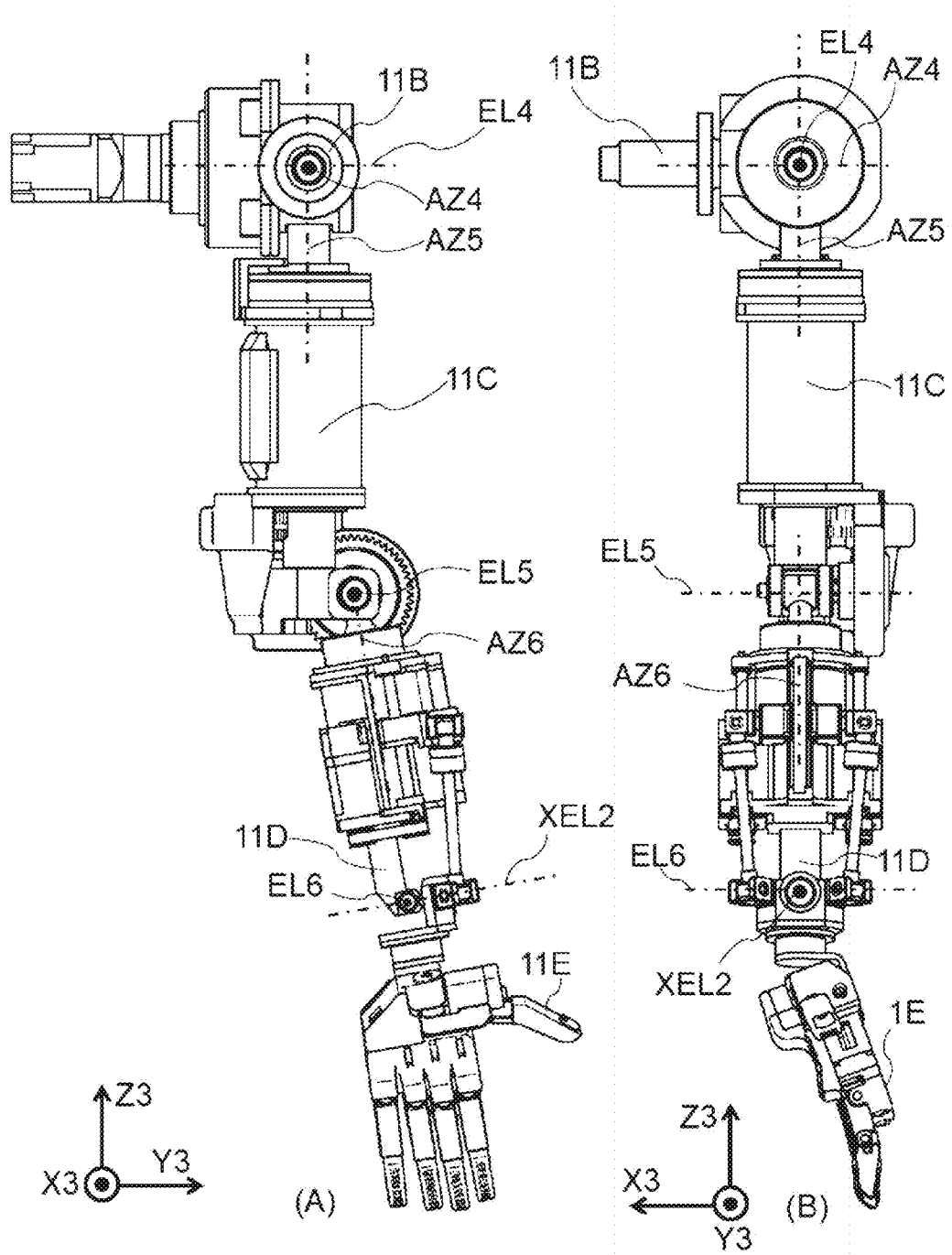
FIG. 7 is a view illustrating the rotation axis included in an arm included in the robot used in the remote control manipulator system of the first embodiment.

With reference to FIGS. 6 and 7, joint 12 is described. FIG. 6 is a view illustrating the rotation axis of robot 1. FIG. 6(A) is a rear view, and FIG. 6(B) is a left side view. FIG. 7 is a view illustrating the rotation axis of arm 11J. FIG. 7 illustrates left arm 11J. FIG. 7(A) illustrates a right side view, and FIG. 7(B) illustrates a front view.

Leg base joint 12E connects leg 11G to vehicle portion 1W so as to be rotatable with two rotational degrees of freedom. Leg base joint 12E is rotatable around an AZ1-axis and an EL1-axis. The AZ1-axis and the EL1-axis are provided on the same plane and are orthogonal to each other. An intersection of the EL1-axis and the AZ1-axis is set as an origin of the first orthogonal coordinate system. The EL1-axis exists in the X1Y1-plane. The AZ1-axis is a rotation axis perpendicular to the upper surface (robot reference surface) of vehicle portion 1W. The robot reference surface is a plane parallel to the X1Y1-plane. The AZ1-axis is a rotation axis that allows the direction to which leg 11G projected on the X1Y1-plane is directed to be changed. The AZ1-axis is parallel to the Z1-axis. The EL1-axis is a rotation axis that allows an angle formed by leg 11G and the X1Y1-plane to be changed. The AZ1-axis is also referred to as an azimuth rotation axis. The EL1-axis is also referred to as an elevation angle rotation axis.

A second orthogonal coordinate system (X2Y2Z2 coordinate system) and a third orthogonal coordinate system (X3Y3Z3 coordinate system) are defined in order to express the posture of humanoid 1H. The second orthogonal coordinate system is a coordinate system defined by using body connection portion 11H as a reference. The second orthogonal coordinate system moves together with body connection portion 11H. The third orthogonal coordinate system is a coordinate system defined by using body 11A as a reference. The third orthogonal coordinate system moves together with body 11A.

Leg tip joint 12F connects body connection portion 11H to the distal end of leg 11G rotatably with two rotational degrees of freedom. Leg tip joint 12F is rotatable around an EL2-axis and an AZ2-axis. The EL2-axis and the AZ2-axis are orthogonal to each other. The EL2-axis is a rotation axis parallel to the EL1-axis. The EL2-axis that allows an angle formed by body connection portion 11H and leg 11G to be changed. The AZ2-axis is a rotation axis passing through body connection portion 11H. When body connection portion 11H rotates around the AZ2-axis, body connection portion 11H, body 11A, and head 11F rotate with respect to leg 11G. The EL2-axis is also referred to as a body inclination rotation axis. The AZ2-axis is also referred to as a body connection portion rotation axis. A front surface of head 11F is a surface on which right camera 2R and left camera 2L are provided. In the reference state, the followings hold with respect to the direction of each portion of humanoid 1H. The right-left direction of body connection portion 11H and body 11A is parallel to the right-left direction of vehicle portion 1W. The front-rear direction (front direction) of body connection portion 11H and body 11A is parallel to the front-rear direction of vehicle portion 1W. The front direction of head 11F is parallel to the front direction of body connection portion 11H and body 11A.

The second orthogonal coordinate system defined by using body connection portion 11H as a reference is defined as follows. The second orthogonal coordinate system expresses the positional relationship between body 11A and body connection portion 11H.

X2-axis: an axis parallel to the right-left direction of body connection portion 11H.

Y2-axis: an axis parallel to the front-rear direction of body connection portion 11H.

Z2-axis: an axis parallel to the height direction of body connection portion 11H. The Z2-axis coincides with the AZ2-axis.

The X2-axis, the Y2-axis, and the Z2-axis are orthogonal to each other. The intersection of the lower end of body connection portion 11H and the AZ2-axis is set as the origin of the second orthogonal coordinate system. In the reference state, the X1-axis and the X2-axis, the Y1-axis and the Y2-axis, and the Z1-axis and the Z2-axis are parallel to each other. The right side of vehicle portion 1W in the reference state is defined as the positive direction of the X2-axis, the front side is defined as the positive direction of the Y2-axis, and the upper side is defined as the positive direction of the Z2-axis.

Body joint 12G connects body 11A to body connection portion 11H rotatably with two rotational degrees of freedom. Body joint 12G is rotatable around an XEL-axis and an AZ3-axis. The XEL-axis is orthogonal to the AZ2-axis and the AZ3-axis. The XEL-axis is a rotation axis that allows an angle between the direction in which body connection portion 11H extends and the direction in which body 11A extends to be changed. The AZ3-axis is a rotation axis passing through body 11A. When rotating around the AZ3-axis, the front direction of body 11A rotates with respect to the front direction of body connection portion 11H. The XEL-axis is also referred to as a body intersection rotation axis. The AZ3-axis is also referred to as a body rotation axis.

The third orthogonal coordinate system defined by using body 11A as a reference is defined as follows. The third orthogonal coordinate system expresses the position of arm 11J with respect to body 11A.

X3-axis: an axis parallel to the right-left direction of body 11A.

Y3-axis: an axis parallel to the front-rear direction of body 11A.

Z3-axis: axis parallel to the height direction of body 11A. The Z3-axis coincides with the AZ3-axis.

The X3-axis, the Y3-axis, and the Z3-axis are orthogonal to each other. The origin of the third orthogonal coordinate system is an intersection of the AZ3-axis and a plane that passes through two shoulder joints 12A and is perpendicular to the AZ3-axis. The right side of body 11A in the reference state is defined as the positive direction of the X3-axis, the front side is defined as the positive direction of the Y3-axis, and the upper side is defined as the positive direction of the Z3-axis.

Neck joint 12D connects head 11F to the upper surface of body 11A rotatably with three rotational degrees of freedom. Neck joint 12D is rotatable around an XH-axis, a YH-axis, and an AZH-axis. The XH-axis is a rotation axis parallel to the X3-axis. The YH-axis is a rotation axis parallel to the Y3-axis. The AZH-axis is a rotation axis passing through head 11F. The XH-axis, the YH-axis, and the AZH-axis intersect at neck joint 12D. The AZH-axis is also referred to as a head rotation axis. In the reference state, the AZH-axis is parallel to the Z3-axis.

When head 11F is rotated around the AZH-axis by neck joint 12D, the capturing directions of right camera 2R and left camera 2L are rotated in the right-left direction. When head 11F is rotated around the XH-axis by neck joint 12D, the capturing directions of right camera 2R and left camera 2L change in a vertical direction. When head 11F is rotated around the YH-axis by neck joint 12D, the line segment connecting the centers of right camera 2R and left camera 2L is not horizontal, and a difference is generated in the heights at which right camera 2R and left camera 2L are present.

The rotation axes of humanoid 1H (excluding arm 11J) are the following nine axes.

AZ1-axis: an azimuth rotation axis at leg base joint 12E.

EL1-axis: an elevation angle rotation axis at leg base joint 12E.

EL2-axis: a body inclination rotation axis at leg tip joint 12F.

AZ2-axis: a body connection portion rotation axis at leg tip joint 12F.

XEL-axis: a body intersection rotation axis at body joint 12G.

AZ3-axis: a body rotation axis at body joint 12G.

XH-axis: a rotation axis parallel to the X3-axis at neck joint 12D.

YH-axis: a rotation axis parallel to the Y3-axis at neck joint 12D.

AZH-axis: a head rotation axis at neck joint 12D.

The structure of arm 11J is described. Arm base 11B is connected to body 11A rotatably with one rotational degree of freedom. Upper arm 11C is connected to arm base 11B rotatably by shoulder joint 12A with two rotational degrees of freedom. Forearm 11D is connected to upper arm 11C rotatably by elbow joint 12B with two rotational degrees of freedom. Hand 11E is connected to forearm 11D rotatably by wrist joint 12C with two rotational degrees of freedom.

As illustrated in FIG. 7, arm 11J has the following seven rotation axes.

AZ4-axis: a rotation axis that allows arm 11J with respect to body 11A to be rotated. A rotation axis that passes through arm base 11B and allows arm base 11B to be rotated. The AZ4-axis is referred to as an arm base rotation axis.

EL4-axis: a rotation axis that allows an angle formed by arm base 11B and upper arm 11C to be changed. The EL4-axis is orthogonal to the AZ4-axis.

AZ5-axis: a rotation axis that passes through upper arm 11C and allows upper arm 11C to be rotated. The AZ5-axis is orthogonal to the EL4-axis. The AZ5-axis is referred to as an upper arm rotation axis.

EL5-axis: a rotation axis that allows an angle formed by upper arm 11C and forearm 11D to be changed. The EL5-axis is orthogonal to the AZ5-axis.

AZ6-axis: a rotation axis that passes through forearm 11D and allows forearm 11D to be rotated. The AZ6-axis is orthogonal to the EL5-axis. The AZ6-axis is referred to as a forearm rotation axis.

EL6-axis: a rotation axis that allows an angle formed by forearm 11D and hand 11E in a plane (front-rear direction rotation plane) including the AZ6-axis and an XEL2-axis to be rotated. The EL6-axis is orthogonal to the AZ6-axis and the XEL2-axis.

XEL2-axis: a rotation axis that allows an angle formed by forearm 11D and hand 11E in a plane (right-left direction rotation plane) including the AZ6-axis and the EL6-axis to be rotated. The XEL2-axis is orthogonal to the AZ6-axis and the EL6-axis.

The AZ4-axis is a rotation axis that allows arm base 11B with respect to body 11A to be rotated. The EL4-axis and the AZ5-axis are rotation axes that allow the connection angle between arm base 11B and upper arm 11C in shoulder joint 12A to be changed. The EL5-axis and the AZ6-axis are rotation axes that allow the connection angle between upper arm 11C and forearm 11D in elbow joint 12B to be changed. The EL6-axis and the XEL2-axis are rotation axes that allow the connection angle between forearm 11D and hand 11E in wrist joint 12C to be changed. The front-rear direction rotation plane and the right-left direction rotation plane are two planes orthogonal to each other, intersection lines of the front-rear direction rotation plane and the right-left direction rotation plane passing through forearm 11D.

The angle of wrist joint 12C is changed by two expandable actuators 13. In other joints 12, the angle of the joint is changed by motor 14 disposed inside skeleton 11 or joint 12. In each of other joints 12, the same number of motors 14 as the order of the rotational degrees of freedom in joint 12 are disposed.

A posture sensor 92 measures a rotation angle of each motor 14 periodically (including a motor that generates force to expand and contract each actuator 13). The measured rotation angle of each motor 14 is transformed into the angle of each joint 12 by a conversion coefficient determined for each motor. When the angle of each joint 12 is determined, the posture of the humanoid 1H is determined. The angle of each joint 12 is referred to as posture data 57. Posture sensor 92 measures posture data 57 indirectly. Posture data 57 is the current angle of each joint 12. The current angle is an angle measured at the latest time. Posture data 57 includes angle information of the seven rotation axes of each arm 11J, angle information of the nine rotation axes of humanoid 1H not including arm 11J, and angle information of a finger joint of hand 11E. A period of measuring posture data 57 is referred to as a control period Tc. For example, Tc is set to be 0.1 seconds. One set of posture data 57 expresses one target posture 54 or one control posture 55. Vehicle posture 56 and posture data 57 represent the position and the posture of robot 1. Vehicle posture 56 and posture data 57 are referred to as position and posture information. Position sensor 91 and posture sensor 92 are referred to as position and posture sensors that detect position and posture information.

When the humanoid has the portion in which the length is changeable, a sensor that measures the length of the portion in which the length is changeable is also included in the posture sensor. The posture data also includes a measurement value of the length of the portion in which the length is changeable.

A temperature sensor 93 measures a temperature of each motor 14. The temperature data of each motor 14 is referred to as a motor temperature 58. Overheating of each motor 14 is detected by measuring the temperature of each motor 14. Motors 14 in which the overheating is detected are stopped to prevent each motor 14 from being damaged.

A distance sensor 94 that measures a distance to a nearby object is provided at a fingertip and a palm of hand 11E. Data representing the distance to the closest object measured by distance sensor 94 is referred to as an object distance 59. Controller 7 determines whether hand 11E is present near object 20 using object distance 59.

A pressure-sensitive sensor 95 detects whether the fingertip of hand 11E is in contact with the object. When the fingertip is in contact with the object, pressure-sensitive sensor 95 also measures magnitude of contact force acting between the object and the fingertip. Tactile data 60 is data including the presence or absence of contact and the contact force detected by pressure-sensitive sensor 95. Wrist joint 12D includes a force sensor 96. Force sensor 96 measures the force acting on wrist joint 12D. The force data measured by force sensor 96 is referred to as acting force data 61.

Each of body 11A, upper arm 11C, forearm 11D, hand 11E, and body connection portion 11H includes an acceleration sensor 97. Acceleration sensor 97 detects acceleration. The data representing the detected acceleration is referred to as acceleration data 62. Acceleration data 62 is integrated to obtain the speed of each portion. Acceleration sensor 97 is provided to detect whether each portion of robot 1 is vibrating and whether the external force is applied to robot 1.

Vehicle posture 56, posture data 57, motor temperature 58, object distance 59, tactile data 60, acting force data 61, and acceleration data 62 are inputted to controller 7. Controller 7 includes a storage 15 that stores these types of data. Posture data 57, motor temperature 58, object distance 59, tactile data 60, acting force data 61, and acceleration data 62 are stored in storage 15 during a period determined for each type of data. Storage 15 also stores target posture 54 and control posture 55 that are sent from control device 3. Each of target posture 54 and control posture 55 is expressed as the command value for the rotation angle around each rotation axis of each joint 12.

Controller 7 uses the inputted data in controlling robot 1. Controller 7 controls actuator 13 and motor 14 such that posture data 57 that is inputted periodically coincides with control posture 55. The control performed by controller 7 may be feedback control or control based on low-order autonomous motion determination.

Controller 7 sends the data measured by various sensors and the like to control device 3 through communicator 9. Communicator 9 has not only a function of sending and receiving communication packets but also a function of generating data to be sent with reference to storage 15 and a function of storing received data in a corresponding area of storage 15.

Right camera 2R and left camera 2L are mounted on head 11F of humanoid 1H. Right camera 2R and left camera 2L can change the capturing direction, which is the direction in which the image is captured, by changing the direction to which head 11F is directed. Even when the direction to which head 11F is directed changes, the positional relationship between right camera 2R and left camera 2L does not change. Right camera 2R and left camera 2L output capturing condition data 63 including an aperture, enlargement magnification, and the like to controller 7 together with the captured image. Controller 7 sends right-eye image 51R, left-eye image 51L, and capturing condition data 63 to control device 3 through communicator 9.

Right-eye image 51R and left-eye image 51L may be sent to control device 3 without through controller 7. Controller 7 sends capturing condition data 63 associated with a capturing time to the control device. Control device 3 associates right-eye image 51R and left-eye image 51L with the capturing condition data 63 according to the capturing time.

Right-eye image 51R, left-eye image 51L, and capturing condition data 63 may be stored by a device different from controller 7 of robot 1, and sent to control device 3. Storage 15 may be provided separately from controller 7.

Control device 3 includes mainly a communicator 31, a structure data storage 32, a state data storage 33, a robot model generator 34, an environment model generator a model integrator 36, a viewpoint data generator 37, a model image generator 38, a control reference information generator 39, a target posture generator 40, a control posture generator 41, and an abnormality detector 42. Structure data storage 32 stores Robot structure data 81 representing the structure of robot 1. State data storage 33 stores data related to changing robot 1 such as posture data 57.

Communicator 31 communicates with robot 1 and the like. Communicator 31 has not only a function of sending and receiving communication packets but also a function of generating data to be sent with reference to structure data storage 32 and state data storage 33, and a function of storing received data in a corresponding area of state data storage 33.

Structure data storage 32 stores robot structure data 81, camera structure data 82, and sensor structure data 83. Robot structure data 81 is data that does not change even when robot 1 moves. For example, Robot structure data 81 is a connection relationship between skeleton 11 and joint 12, a dimension of skeleton 11, a rotatable angle of joint 12, a partial 3D-model representing an outer shape of skeleton 11, and the like. The lengths of leg 11G, upper arm 11C, forearm 11D, and the like, the interval between two shoulder joints 12A, and the like are also robot structure data 81. Robot structure data 81 is manipulator structure data representing the structure of robot 1 that is the manipulator.

Camera structure data 82 is data representing the structures of right camera 2R and left camera 2L. Camera structure data 82 includes a vertical and horizontal size of the image that can be captured, a viewing angle, a possible range of enlargement magnification, and the like as data common to right camera 2R and left camera 2L. Camera structure data 82 includes relative positions of right camera 2R and left camera 2L with respect to neck joint 12D, an interval between right camera 2R and left camera 2L, and a front direction of right camera 2R and left camera 2L. The front direction of right camera 2R and left camera 2L is a direction in which the center of each visual field is directed with respect to head 11F. The relative positions and the front direction of right camera 2R and left camera 2L with respect to neck joint 12D may be stored as Robot structure data 81. The capturing direction of the camera is a direction in which the front direction of the camera is expressed by the site coordinate system (XYZ-coordinate system).

Sensor structure data 83 is data such as installation positions of various sensors, types of sensors, and the storage position of data in sending the measured data.

State data storage 33 stores a vehicle posture 56, posture data 57, a motor temperature 58, an object distance 59, tactile data 60, acting force data 61, acceleration data 62, capturing condition data 63, a robot three-dimensional model 64, a camera posture 65, camera point group raw data 66, camera point group data 67, surrounding point group data 68, an integrated three-dimensional model 69, and viewpoint data 70.

Robot three-dimensional model 64 is a three-dimensional model of robot 1 including right camera 2R and left camera 2L. Robot three-dimensional model 64 is expressed by the site coordinate system (XYZ-coordinate system). Robot three-dimensional model 64 is generated by robot model generator 34. Robot three-dimensional model 64 includes camera posture 65. Camera posture 65 is data representing positions and capturing directions in the site coordinate system of right camera 2R and left camera 2L. Robot three-dimensional model 64 is a three-dimensional model of robot 1 that is the manipulator. Camera posture 65 is a three-dimensional model of right camera 2R and left camera 2L.

Camera point group raw data 66 is point group data representing the things in the surrounding environment including object 20 obtained by performing image processing on right-eye image 51R and left-eye image 51L. The point group data is a set of coordinate values of points representing the things. Camera point group raw data 66 is expressed as a relative position based on each position of right camera 2R and left camera 2L as a reference. Camera point group data 67 is point group data in which the camera point group raw data 66 is coordinate-transformed and expressed as coordinate values in the site coordinate system. Surrounding point group data 68 is point group data generated by integrating camera point group data 67 at different camera postures 65. Surrounding point group data 68 is the surrounding environment model that is a three-dimensional model of the surrounding environment. Different camera posture 65 means that at least one of the position and the posture of at least one of right camera 2R and left camera 2L is different.

Integrated three-dimensional model 69 is a three-dimensional model in which robot three-dimensional model 64 and surrounding point group data 68 are integrated. Viewpoint data 70 is data representing the position and a visual line direction of the viewpoint of viewing object 20 and robot 1 in model image 53.

Robot model generator 34 generates robot three-dimensional model 64 with reference to latest vehicle posture 56 and posture data 57, robot structure data 81, and camera structure data 82 that are inputted. Robot three-dimensional model 64 is the manipulator model that is a three-dimensional model of the manipulator. Robot model generator 34 is the manipulator model generator that generates the manipulator model. Robot model generator 34 determines the posture of each skeleton 11 in the first orthogonal coordinate system (X1Y1Z1-coordinate system) by substituting posture data 57 representing the angle of each joint included in robot 1 into an equation determined by robot structure data 81. For example, a method disclosed in PTL 2 is used as a method for determining the posture of each skeleton 11. Furthermore, the partial 3D-model representing the outer shape of each skeleton 11 is moved and rotated according to the posture of each skeleton 11. A group of the partial 3D-models of moved and rotated skeletons 11 is the robot three-dimensional model. The robot three-dimensional model at this stage is represented by the first orthogonal coordinate system. Robot model generator 34 transforms the robot three-dimensional model in the first orthogonal coordinate system into robot three-dimensional model 64 in the site coordinate system using vehicle posture 56. Robot three-dimensional model 64 also includes camera posture 65. Camera posture 65 may be generated by a functional module different from robot model generator 34. In this case, the robot model generator does not refer to camera structure data 82.

Environment model generator 35 generates surrounding point group data 68 that is the surrounding environment model. Environment model generator 35 includes an image processor 43, a camera point group raw data generator 44, a camera coordinate convertor 45, and a camera point group matcher 46. Image processor 43 performs image processing on right-eye image 51R and left-eye image 51L based on the positions and capturing directions of right camera 2R and left camera 2L. Image processor 43 performs image processing on right-eye image 51R and left-eye image 51L to extract feature points of the things in the surrounding environment including object 20. The feature point is a point representing a boundary line or a characteristic shape of the thing. There are some images from which the feature point cannot be extracted. For example, in the case where the color of the thing and the color of the background are almost the same and the boundary line of the thing cannot be determined from the image, the case where the surface shape of the thing is flat and the feature point cannot be detected, or the like. In the case where the feature point cannot be extracted, the camera point group raw data 66 is not generated.

Camera point group raw data generator 44 generates the position data of feature points extracted in both right-eye image 51R and left-eye image 51L. The principle thereof is described briefly as follows. The feature point displayed in one image exists on a straight line in a three-dimensional space passing through the position of the camera that captures the image. The direction of the straight line in which the feature point exists is determined from a pixel position and the capturing direction of the feature point in the image. When the images captured from different viewpoints at the same time or during a period in which the object having the feature point is stationary are combined, because the feature point exists at an intersection of a plurality of straight lines, a relative position of the feature point with respect to positions of two cameras can be determined.

Camera point group raw data generator 44 determines the position in the three-dimensional space of each feature point from two images captured simultaneously with parallax of right-eye image 51R and left-eye image 51L. The pixel position in the image of the feature point extracted from right-eye image 51R means that the feature point exists on the straight line in the three-dimensional space determined from the pixel position. This straight line is a straight line that passes through the position of right camera 2R and exists in the direction in the three-dimensional space corresponding to the pixel position in the image. For example, the center pixel of the image is the straight line extending in the capturing direction. The pixels at both ends in the right-left direction and in the center of the vertical direction are the straight line extending in the direction inclined in the right-left direction by a half of the viewing angle with respect to the capturing direction. The same applies to left-eye image 51L. The pixel position of the feature point extracted from left-eye image 51L means that the feature point exists on the straight line that passes through the position of left camera 2L and represents the direction in the three-dimensional space corresponding to the pixel position. The feature points extracted in both right-eye image 51R and left-eye image 51L exist at the intersection of the straight line in the three-dimensional space determined from right-eye image 51R and the straight line in the three-dimensional space determined from left-eye image 51L. Camera point group raw data generator 44 obtains the intersection of the two straight lines in the three-dimensional spaces for each feature point, and sets the position data of the intersection as the position data of the feature point. A collection of the position data of all feature points is camera point group raw data 66.

The camera point group raw data 66 is expressed as relative positional data with respect to right camera 2R and left camera 2L. Camera coordinate convertor 45 transforms the camera point group raw data 66 of each feature point into camera point group data 67 using camera posture 65. Camera point group data 67 is position data in the site coordinate system. Camera point group data 67 may be generated using an average of the pixel positions of the feature points extracted from the images at different times at the same camera posture 65. Camera point group matcher 46 generates surrounding point group data 68 by taking the average of camera point group data 67 for the same feature point in different camera postures 65. Surrounding point group data 68 is the surrounding environment model that is the three-dimensional model of the thing in the surrounding environment including object 20. Environment model generator 35 is the image processing model generator that generates the surrounding environment model by image processing.

When new camera point group data 67 is generated after surrounding point group data 68 is generated, camera point group matcher 46 corrects surrounding point group data 68 with new camera point group data 67. When the position of the thing is changed in new camera point group data 67, the point group data in surrounding point group data 68 related to the thing is moved to the new position.

Model integrator 36 integrates robot three-dimensional model 64 and surrounding point group data 68 to generate integrated three-dimensional model 69. Viewpoint data generator 37 generates viewpoint data 70 based on the information inputted by operator 30. Viewpoint data 70 is data representing the position and the visual line direction of the viewpoint in model image 53. For example, an initial value of viewpoint data 70 is the viewpoint and the capturing direction of right camera 2R. Operator 30 inputs information related to viewpoint data 70 using an input device such as a keyboard, a mouse, a pointing device, or a joystick. For example, using the input device, operator 30 inputs the instruction to move the viewpoint to the left, right, up, and down with respect to model image 53 displayed on display device 5. Alternatively, operator 30 may input an increase or decrease in the distance to the viewpoint. Viewpoint data generator 37 generates viewpoint data 70 in which the viewpoint is moved such that the thing being present in the moving direction inputted by operator 30 is viewed. For example, when operator inputs the instruction to move model image 53 downward, the viewpoint position is raised and the visual line direction is changed downward. For example, when operator 30 inputs the instruction to move the visual point to the right, the visual point is moved to a position rotated counterclockwise when viewed from above, and the visual line direction is also rotated counterclockwise to change the visual point. Operator 30 can change the position of the viewpoint and the visual line direction independently.

Model image generator 38 generates model image 53 based on integrated three-dimensional model 69 and viewpoint data 70. Model image generator 38 generates, as model image 53, the image captured when the camera is set at the position represented by viewpoint data 70 and the camera captures the image of integrated three-dimensional model 69 in the capturing direction setting to be the visual line direction represented by viewpoint data 70. Generated model image 53 is displayed on display device 5. Model image 53 may be generated for each of the plurality of viewpoint data 70, and model images 53 from the plurality of viewpoints may be displayed simultaneously on display device 5. Model image 53 is an image of the integrated three-dimensional model 69 viewed from the viewpoint designated by operator 30. Display device 5 is the model image display device that displays model image 53.

Control reference information generator 39 generates control reference information displayed on display device 5. The control reference information is information from various sensors mounted on robot 1, data regarding the current posture or the target posture of robot 1, and the like. For example, distance information between object 20 or the surrounding environment and robot 1, information regarding the position and posture of robot 1 and the change speed thereof, the current angle at each joint and the current temperature of the motor that drives each joint, the magnitude of acceleration and vibration of each portion of robot 1, the target angle of each joint, and the like are the control reference information. Control reference information generator 39 selects and processes information to generate the control reference information. Control reference information generator 39 generates the control reference information such that the availability is high and such that operator 30 can recognize the control reference information easily and visually.

Target posture generator 40 generates target posture 54 and vehicle posture 56 from the motions of the hand and the foot of operator 30 inputted to upper body target posture inputter 6H and vehicle posture inputter 6W. Target posture 54 is data representing the posture that robot 1 takes finally. Control posture generator 41 generates control posture 55 used for controlling robot 1 such that robot 1 takes the posture expressed by target posture 54. Control posture 55 is expressed as an angle to be taken by each joint included in robot 1 after a predetermined time elapses. Control posture 55 is corrected according to the lapse of time. Control posture 55 is corrected also when target posture 54 is changed. Control posture generator 41 may be included in controller 7. Control posture generator 41 is the control signal generator that generates the control signal controlling robot 1 from the operation instruction. The control signal may be generated by a method different from using the control posture. Any control signal generator may be used as long as the control signal generator generates the control signal controlling robot 1 from the operation instruction.

Abnormality detector 42 receives motor temperature 58, acting force data 61, and acceleration data 62, and detects whether an abnormality occurs or not in robot 1 by comparing them with thresholds. When abnormality detector 42 detects the abnormality, control device 3 stops robot 1.

Figure 8:
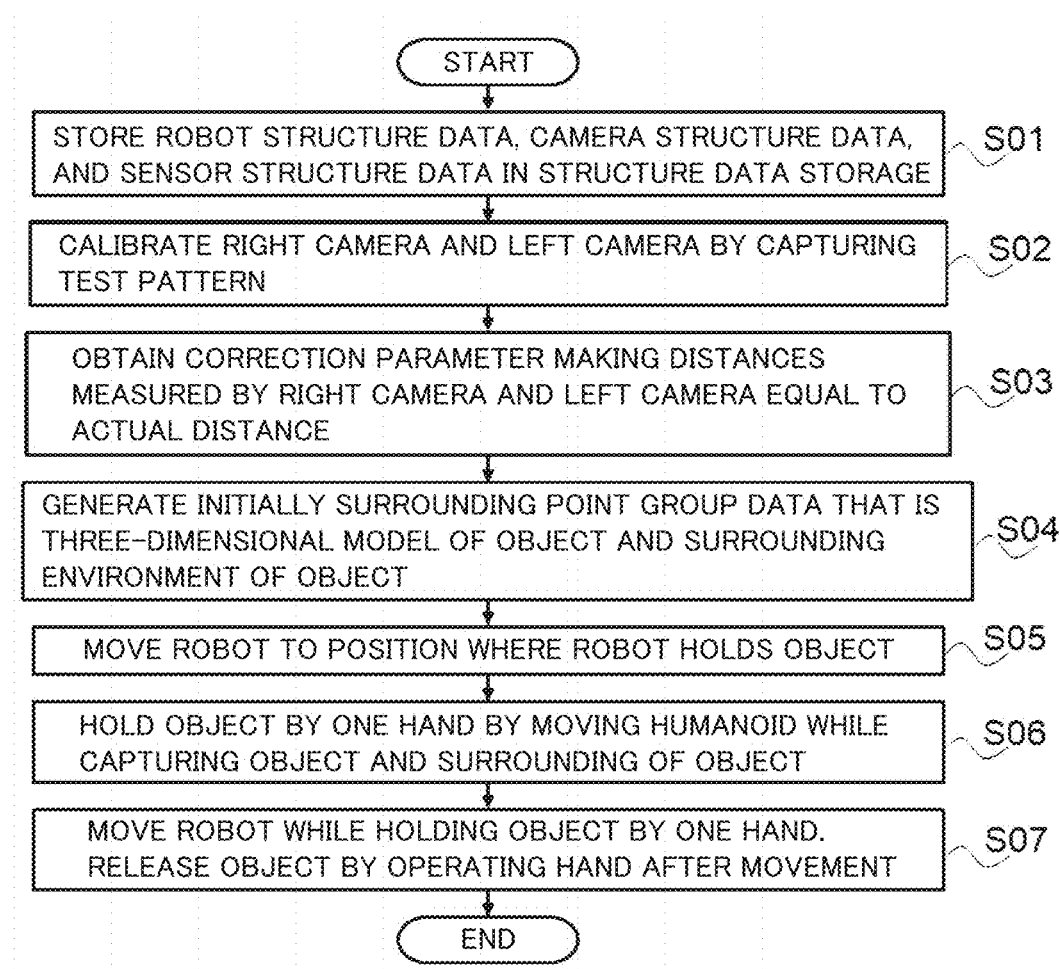
FIG. 8 is a flowchart illustrating a procedure for controlling the robot remotely using the remote control manipulator system of the first embodiment.

The operation is described. FIG. 8 is a flowchart illustrating a procedure for controlling the robot remotely using the remote control manipulator system of the first embodiment. Here, a case where robot 1 moves with object 20 held by one hand 11E is described.

In step S01, robot structure data 81, camera structure data 82, and sensor structure data 83 are stored in structure data storage 32.

In step S02, right camera 2R and left camera 2L are calibrated by capturing a test pattern. For example, the test pattern is a pattern in which points of a predetermined size and shape are arranged at predetermined intervals. The test pattern is disposed at a position of a predetermined distance in front of the camera to be calibrated that is right camera 2R or left camera 2L, and the camera to be calibrated captures the test pattern. The camera to be calibrated is calibrated such that the captured image is appropriate. A calibration target is aberration or the like of the lens. Thereafter, the test pattern is captured simultaneously by right camera 2R and left camera 2L. An interval and an installation angle between the two cameras are adjusted such that the images captured by right camera 2R and left camera 2L have an appropriate relationship. The procedure for capturing the test pattern by right camera 2R and left camera 2L individually may be omitted.

A correction parameter that makes the distances measured by right camera 2R and left camera 2L equal to the actual distance is obtained in step S03. Robot 1 is caused to take the posture for calibration, the object (referred to as a ruler object) of a predetermined length is disposed at the position of a predetermined distance from right camera 2R and left camera 2L, and the ruler object is captured. The distance to the ruler object and the length of the ruler object are measured from the captured image. The ruler object is captured and measured at several distances. A conversion coefficient to be multiplied and an offset value to be added are obtained such that the measured distance and length are made equal to the actual distance and length. The conversion coefficient and the offset value are the correction parameters.

Surrounding point group data 68, which is the three-dimensional model of object 20 and a surrounding environment that is present around object 20, is generated for the first time in step S04. The generating for the first time is referred to as initial generation. With reference to the flowchart in FIG. 9, the operation in S04 is described. In step S05, robot 1 is moved to the position where robot 1 holds object 20. In step S06, operator 30 moves humanoid 1H to cause object 20 to be held by one hand 11E while capturing object 20 and the surrounding of object 20. With reference to the flowchart in FIG. 10, the operation in S06 is described. In step S07, robot 1 is moved while object 20 is held by one hand 11E. After the movement, hand 11E is operated to release object 20.

S04 may be omitted, and surrounding point group data 68 may not be generated initially. In this case, surrounding point group data 68 is generated when robot 1 handles object 20.

Figure 9:
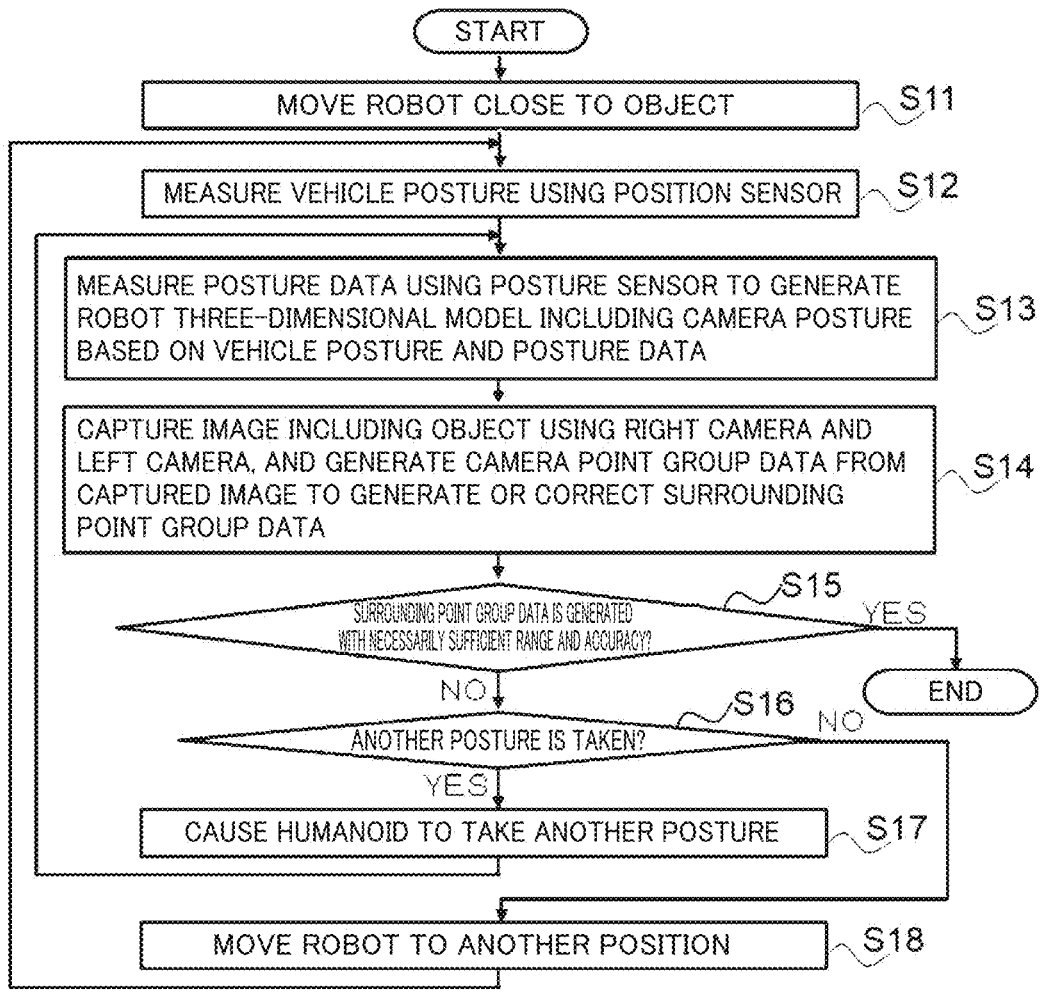
FIG. 9 is a flowchart illustrating a procedure for generating surrounding point group data initially using the remote control manipulator system of the first embodiment.

With reference to FIG. 9, a procedure for generating surrounding point group data 68 that is the three-dimensional model of the surrounding environment including object 20 is described. In S11, robot 1 is moved close to object 20. In step S12, position sensor 91 measures vehicle posture 56. In step S13, posture sensor 92 measures posture data 57, and generates robot three-dimensional model 64 including camera posture 65 based on vehicle posture 56 and posture data 57. In step S14, right camera 2R and left camera 2L capture the images including object 20, extract the feature points from the captured images, and generate camera point group raw data 66. Camera point group data 67 is generated using camera point group raw data 66 and camera posture 65, and surrounding point group data 68 is generated or corrected. In step S15, it is checked whether surrounding point group data 68 is generated with a necessary and sufficient range and accuracy. When surrounding point group data 68 is generated with the necessary and sufficient range and accuracy (YES in S15), the processing ends.

When surrounding point group data 68 is not generated with the necessary and sufficient range and accuracy (NO in S15), it is checked in step S16 whether to take another posture. When taking another posture (YES in S16), humanoid 1H is caused to take another posture in step S17. After the execution of S17, the processing returns to S13. When not taking another posture (NO in S16), robot 1 is moved to another position in step S18. After the execution of S18, the processing returns to S12.

Figure 10:
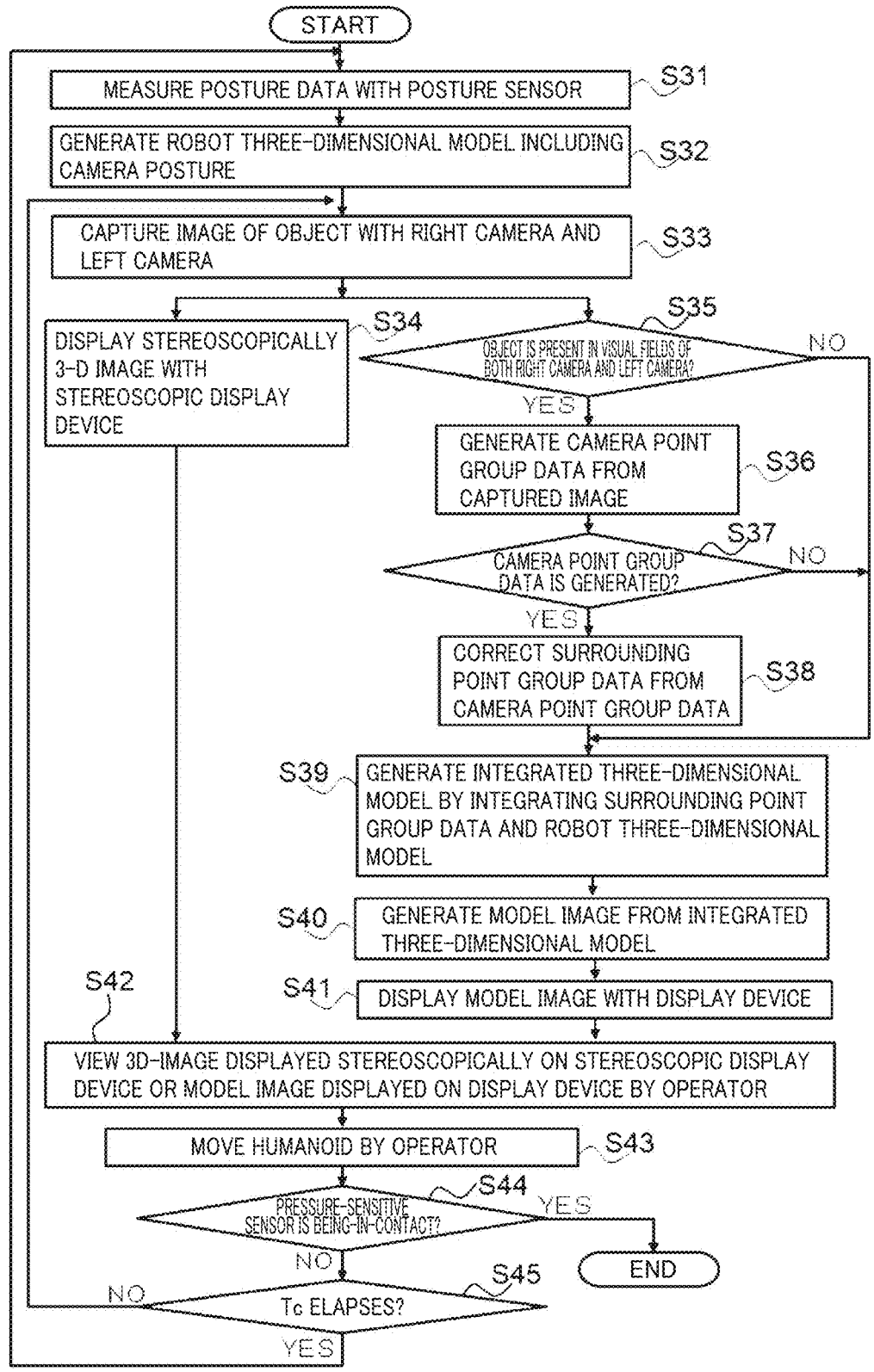
FIG. 10 is a flowchart illustrating a remote control procedure when the robot holds an object using the remote control manipulator system of the first embodiment.

With reference to FIG. 10, a procedure when humanoid 1H holds object 20 is described. When humanoid 1H holds object 20, vehicle portion 1W is still. In step S31, posture sensor 92 measures posture data 57. In step S32, robot three-dimensional model 64 including camera posture 65 is generated from vehicle posture 56 and posture data 57. In step S33, right camera 2R and left camera 2L capture the images of object 20. In step S34, stereoscopic display device 4 stereoscopically displays 3D-image 52. In step S35 in parallel with step S34, it is checked whether object 20 is present in the visual fields of both right camera 2R and left camera 2L.

When hand 11E is brought close to object 20, in the case where object 20 is hidden by humanoid 1H or in the case where it is difficult to turn head 11F in the direction in which object 20 is present, object 20 cannot be present in the visual fields of both right camera 2R and left camera 2L.

When object 20 is present in the visual fields of both right camera 2R and left camera 2L (YES in S35), camera point group data 67 is generated from the captured image in step S36. In step S37, it is checked whether camera point group data 67 is generated. When camera point group data 67 is generated (YES in S37), surrounding point group data 68 is corrected by camera point group data 67 in step S38. In step S39, surrounding point group data 68 and robot three-dimensional model 64 are integrated to generate integrated three-dimensional model 69. In step S40, model image 53 is generated from integrated three-dimensional model 69. In step S41, display device 5 displays model image 53.

When object 20 is not present in the visual fields of at least one of right camera 2R and left camera 2L (NO in S35), or when camera point group data 67 cannot be generated (NO in S37), the processing proceeds to S39. In this case, stored surrounding point group data 68 is used in S39.

In step S42, operator 30 views 3D-image 52 stereoscopically displayed on stereoscopic display device 4 or model image 53 displayed on display device 5. In step S43, operator 30 moves humanoid 1H. In this manner, operator 30 operates humanoid 1H while recognizing the relative positional relationship between object 20 and hand 11E included in robot 1.

In step S44, it is checked whether the output (tactile data 60) of pressure-sensitive sensor 95 of hand 11E is being-in-contact. That the output of pressure-sensitive sensor 95 is being-in-contact means that hand 11E is in contact with the object. When the output of pressure-sensitive sensor 95 is being-in-contact (YES in S44), the processing ends. Thereafter, the control is performed such that hand 11E holds object 20 appropriately based on the output of pressure-sensitive sensor 95. When the output of pressure-sensitive sensor 95 is not being-in-contact (NO in S44), it is checked in step S45 whether predetermined control period Tc elapses. When Tc elapses (YES in S45), the processing returns to S31. When Tc does not elapse (NO in S45), the processing returns to S33.

In remote control manipulator system 100, operator 30 can freely switch between stereoscopically-displayed 3D-image 52 and model image 53 through moving the head of operator 30 to view stereoscopically-displayed 3D-image 52 and model image 53. Model image 53 is the image of robot 1 and object 20 viewed from the viewpoint designated by operator 30. Remote control manipulator system 100 measures the positional relationship between object 20 and hand 11E, and displays model image 53 representing the measured positional relationship. Operator 30 views the image that is the appropriate one of 3D-image 52 and model image 53, or both of the images. From the viewing result, the current state of humanoid 1H including hand 11E is recognized, and humanoid 1H is controlled remotely. Operator 30 repeats the viewing of the current state and the operation of moving humanoid 1H until object 20 and hand 11E come into contact with each other. Accordingly, operator 30 can control robot 1 remotely to perform work such as pushing, pulling, and holding the object more accurately and easily than before.

Model image 53 can be viewed from an arbitrary viewpoint. Furthermore, model images 53 viewed from a plurality of different viewpoints are displayed on display device 5 simultaneously or being switched, and operator 30 can recognize object 20 and the surrounding environment from the plurality of different viewpoints. For example, two model images 53 may be displayed simultaneously on display device one of the images displayed simultaneously may be model image 53 from the same viewpoint, and the other image may be displayed by switching model images 53 viewed from the plurality of viewpoints. The operator can view the control reference information represented by an image, a character, a symbol, or the like. As a result, operator 30 can recognize the relative positional relationship between robot 1 and object 20 more accurately and easily than before. Even in the situation where it is difficult to recognize the positional relationship unless model image 53 is displayed, operator 30 can recognize the current positional relationship between robot 1 and object accurately, and perform the precise operation. For example, the situation where it is difficult to recognize the positional relationship between robot 1 and object 20 is the case where arm 11J or the like included in robot 1 hides object 20, the case where an obstacle is present between robot 1 and object 20, or the case where object 20 is located at the position where hand 11E cannot reach object 20 in the posture in which head 11F is directed toward object 20.

Operator 30 can view natural 3D-image 52, and can operate the robot 1 while recognizing the current posture of robot 1 and the relationship between object 20 and its surrounding environment. Consequently, operator 30 can perform the work of handling object 20 more precisely and accurately.

The present disclosure can also be applied to a humanoid robot that moves with two legs, a robot with only an upper body, a robot arm with one arm, a robot hand, an industrial manipulator, and the like, in addition to the crawler mobile robot. The present disclosure can be applied to any machine or device that handles the object. The machine or device that handles the objects is called a manipulator. The object includes a tool possessed by the robot, the object processed by the tool, the object that is operated without using the tool, and the like. Examples of the tool include a machine shop tool such as a screwdriver and a plier, a knife such as a kitchen knife and a scalpel, stationery such as scissors, a ruler, and a writing tool, a carpenter tool, a cleaning tool, an information device such as a personal computer, a building door or window, and a hand cart that carries luggage, and a wheelchair and a mobile bed that move a human. The object may be liquid, solid, or gas. The object includes a human, an animal, and a plant.

According to the remote control manipulator system of the present disclosure, work operation performance of the remote control manipulator is improved. Using a remote control robot or manipulator, hard work such as work in a dangerous environment or a harsh or uncomfortable environment for a human and a handling of a heavy object can be performed while a load on the human is reduced. The controlled robot or manipulator remotely can assist the worker engaged in disaster response and the like. The remote control manipulator can also be used in an industrial field where there is a labor shortage. The remote control manipulator can also be used for care assistance by the robot that is becoming important in an aging society.

It is assumed that the manipulator remote control system is used in a case in which a holding operation is performed by the remote work machine or the hand included in the robot while the image is viewed from a remote location for a disaster relief or at a factory of general industry or at a construction site. However, in the actual operation, it is difficult to perform prior learning or modelling of an environment and a holding target. In a vision-based operation system of the remote control manipulator of the present disclosure, the operator can recognize the surrounding environment and a work situation from vision-base information, and the operation reliability of the remote control manipulator is expected to be improved.

As the target posture input device, the target posture and the vehicle posture may be inputted with a control stick, a steering wheel (handle), a lever, a joystick, a button, a knob, a pedal, or the like. A method for capturing the operation of the operator with the camera and reading the target posture from the captured image may be used. A target posture input device in which a sensor reading the motion of the operator or a tension degree of a muscle is attached to the body of the operator may be used. Any target posture input devise may be used as long as the operation in which the manipulator moves or is still can be inputted.

The above is also applied to other embodiments.

Second Embodiment

Figure 11:
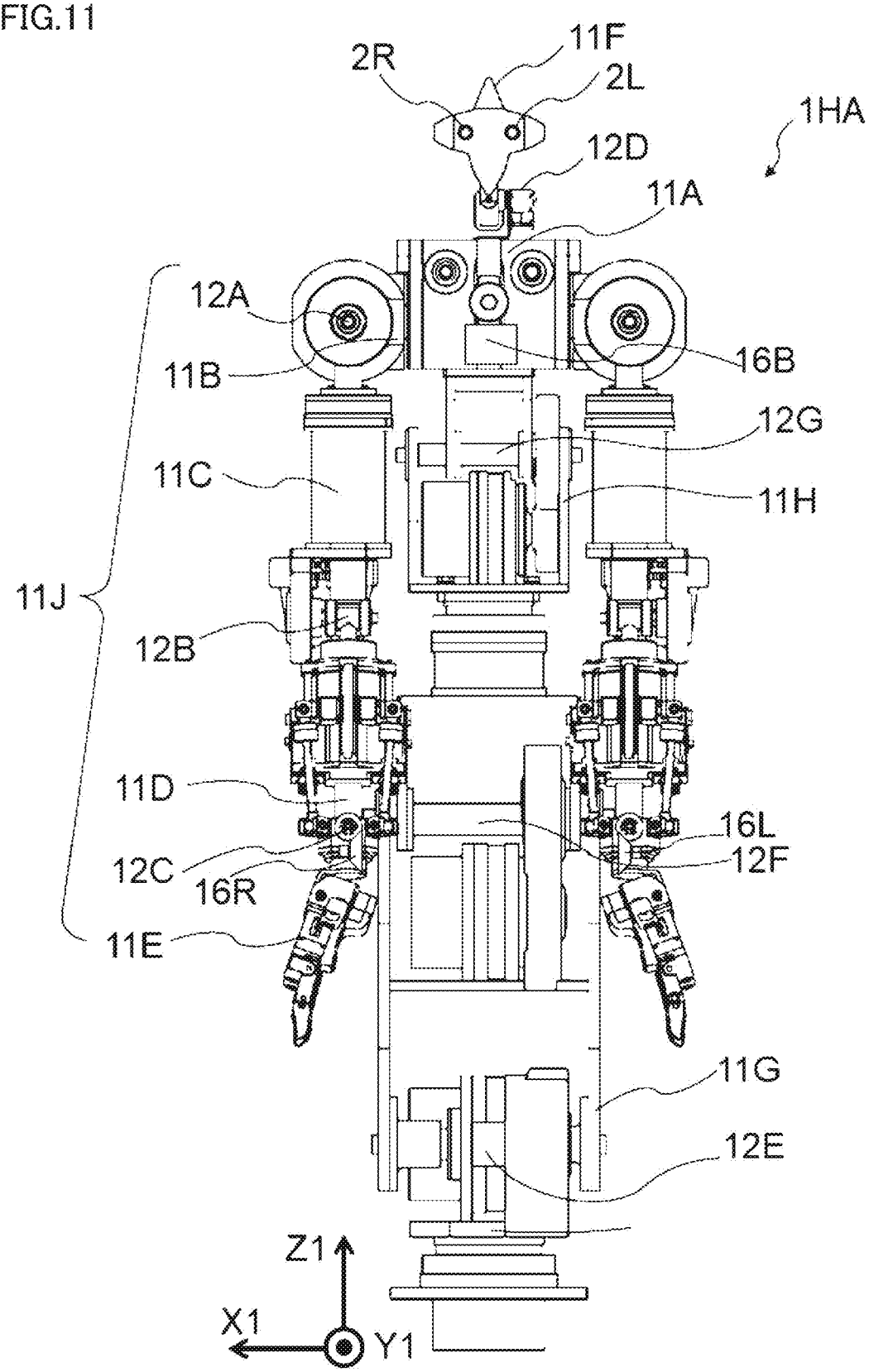
FIG. 11 is a front view illustrating a humanoid included in the robot used in a remote control manipulator system according to a second embodiment.
Figure 12:
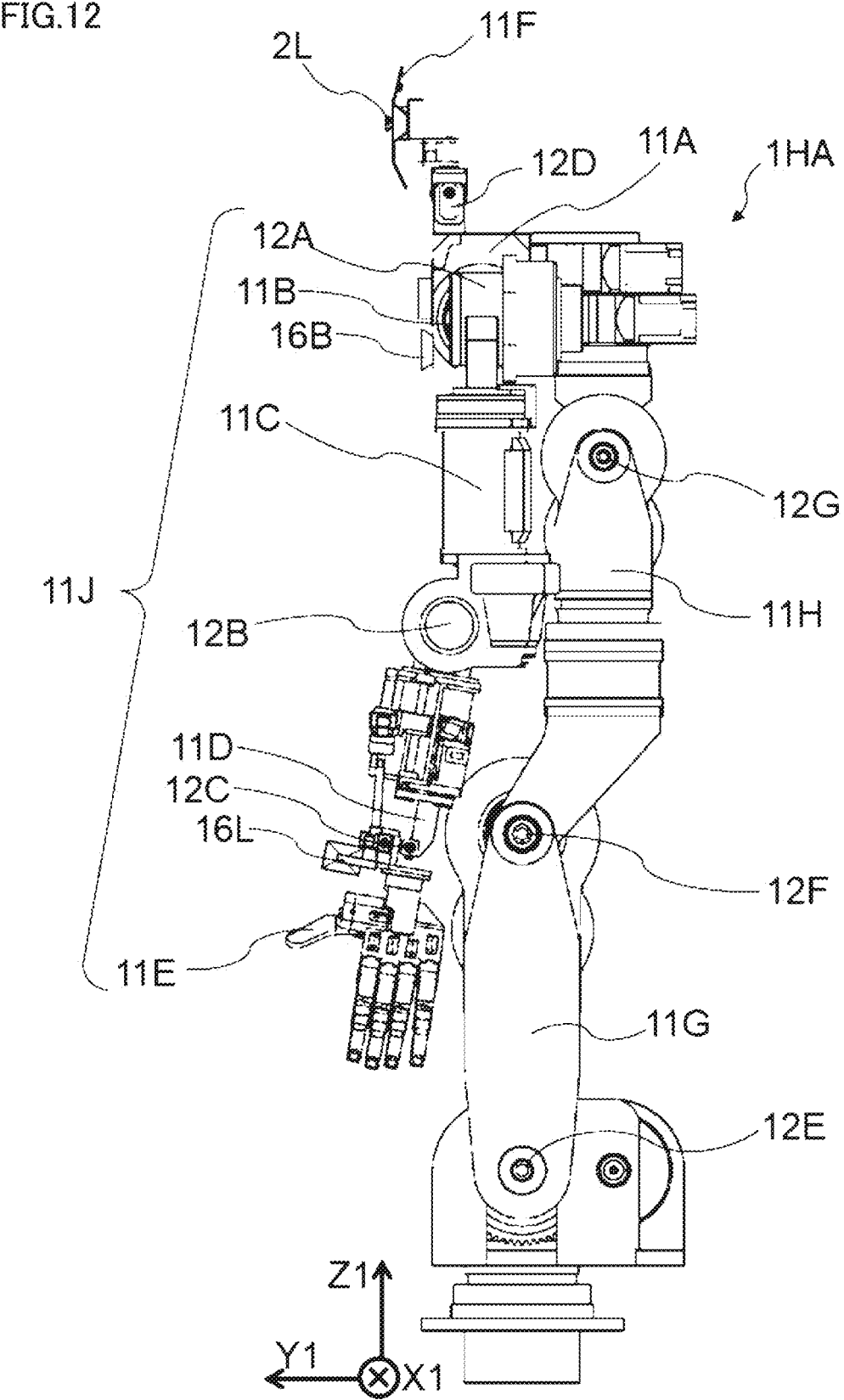
FIG. 12 is a left side view illustrating the humanoid included in the robot used in the remote control manipulator system of the second embodiment.
Figure 13:
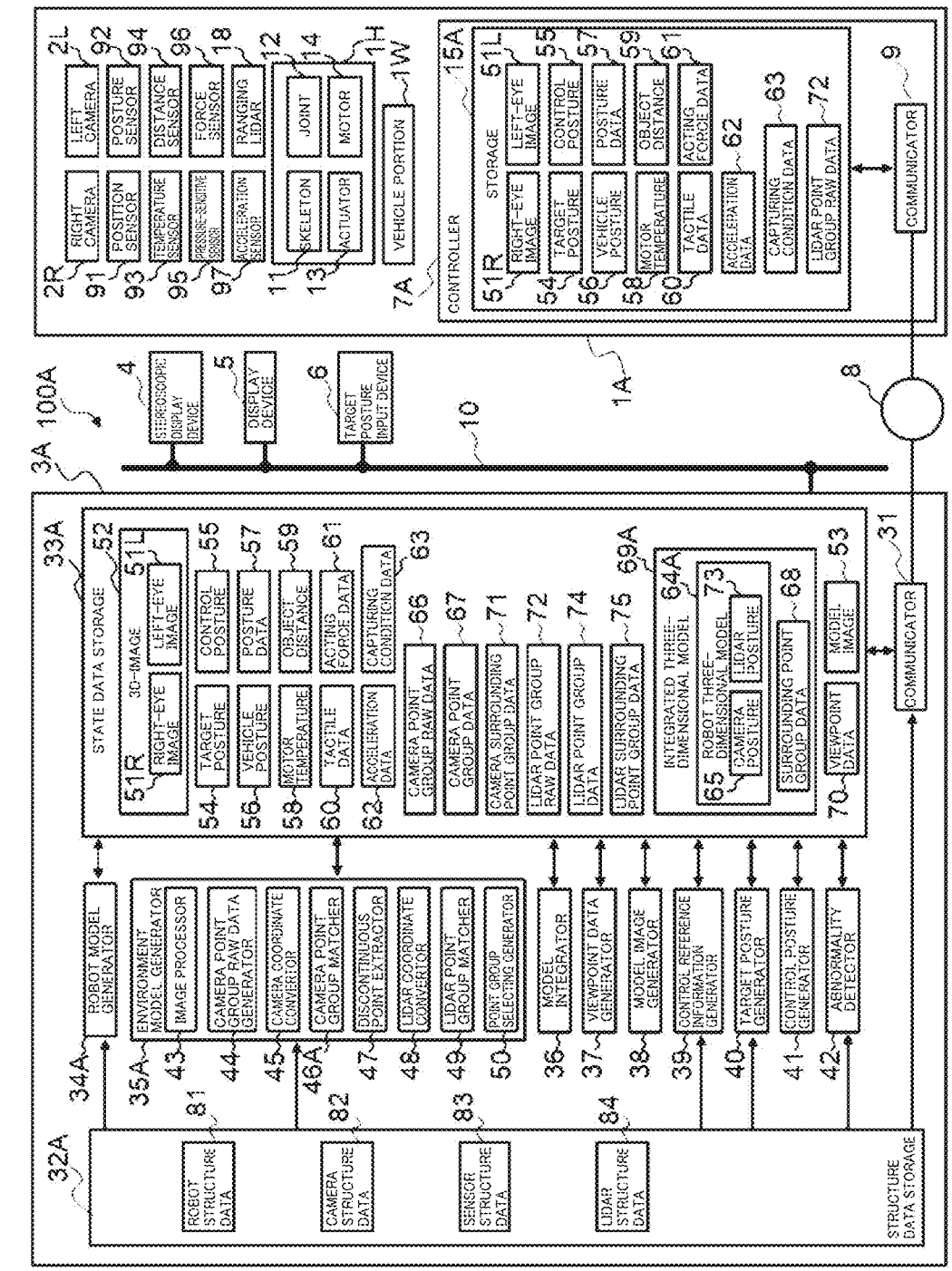
FIG. 13 is a block diagram illustrating a functional configuration of the remote control manipulator system of the second embodiment.

A second embodiment is the case where the robot includes a distance measuring lidar and the remote control manipulator system has a function of generating the three-dimensional model of the surrounding environment from point group data measured by the distance measuring lidar. With reference to FIGS. 11 to 13, a configuration of the remote control manipulator system of the second embodiment is described. FIG. 11 is a front view illustrating a humanoid included in the robot used in a remote control manipulator system of the second embodiment. FIG. 12 is a left side view illustrating the humanoid included in the robot used in the remote control manipulator system of the second embodiment. FIG. 13 is a block diagram illustrating a functional configuration of the remote control manipulator system of the second embodiment.

With reference to FIGS. 11 and 12, differences of a robot 1A with respect to robot 1 in FIGS. 4 and 5 are described. A humanoid 1HA included in robot 1A includes a distance measuring lidar 16R on right forearm 11D, a distance measuring lidar 16L on left forearm 11D, and a distance measuring lidar 16B on the front surface of body 11A. Distance measuring lidar 16R is provided at the portion on the front side close to wrist joint 12C of right forearm 11D. The front side of forearm 11D is the side facing the front of humanoid 1HA in the reference state in which arm 11J is hung down. Distance measuring lidar 16L is provided at the portion on the front side close to wrist joint 12C of left forearm 11D. Distance measuring lidars 16R, 16L are mounted on forearm 11D so as to emit laser light to the inside of forearm 11D. The inside of forearm 11D is the side where forearm 11D in the reference state is directed toward the center line of robot 1A. The center line of robot 1A extends in the height direction when robot 1A in the reference state is viewed from the front. Distance measuring lidar 16B is provided so as to emit light to the front side of body 11A. For example, the humanoid may include only one distance measuring lidar 16R.

Distance measuring lidars 16R, 16L, 16B emit the laser light while scanning (scanning) the laser light, and measure the distance to the thing being present in the direction in which the laser light is emitted based on a time from emission of the laser light to reception of reflected laser light reflected by the object. Each of distance measuring lidars 16R, 16L, 16B generates lidar point group raw data 72. The direction in which the distance measuring lidar emits the laser light at the center of the range where the laser light is scanned is referred to as an emitting direction of the distance measuring lidar. The emitting direction of the distance measuring lidar is also referred to as a distance measuring direction. Lidar point group raw data 72 is a set of data expressing the distance to the thing being present at each angle with respect to the emitting direction determined for each of distance measuring lidars 16R, 16L, 16B.

A controller 7A included in robot 1A also controls whether to operate distance measuring lidars 16R, 16L, 16B. A storage 15A included in controller 7A also stores lidar point group raw data 72 measured by the distance measuring lidars 16R, 16L, 16B. Whether to operate the distance measuring lidars 16R, 16L, 16B without modifying controller 7 may be controlled by a control device 3A without through controller 7, and lidar point group raw data 72 may be sent to control device 3A without through controller 7.

In FIG. 13 illustrating the functional configuration of a remote control manipulator system 100A, points different from FIG. 2 in the first embodiment are described. In control device 3A, a structure data storage 32A, a state data storage 33A, a robot model generator 34A, and an environment model generator 35A are modified. Structure data storage 32A also stores lidar structure data 84. Lidar structure data 84 stores the emitting direction and the scan angle range of each of distance measuring lidars 16R, 16L, 16B. The emitting direction is data defining the angle with respect to right or left forearm 11D or body 11A. The scan angle range is data defining the range of the angle at which the laser light is scanned. For example, the scan angle range is the range of scan angles such as 240 degrees in the horizontal direction and 90 degrees in the vertical direction. Lidar structure data 84 is ranging sensor structure data representing the structures of distance measuring lidars 16R, 16L, 16B that are the ranging sensor.

In state data storage 33A, a robot three-dimensional model 64A is modified, and camera surrounding point group data 71, lidar point group raw data 72, lidar point group data 74, and lidar surrounding point group data 75 are added. Robot three-dimensional model 64A also includes a lidar posture 73. Lidar posture 73 is data representing the position and the emitting direction in the site coordinate system of distance measuring lidars 16R, 16L, 16B. Lidar posture 73 is the three-dimensional model of distance measuring lidars 16R, 16L, 16B.

Lidar point group raw data 72 is data of the point group measured by distance measuring lidars 16R, 16L, 16B. Lidar point group raw data 72 is data measured by using each of the emitting directions of distance measuring lidars 16R, 16L, 16B as a reference. In lidar point group raw data 72, the direction in which the measured distance having a large difference with the measured distance in an adjacent direction in the scanned range is recognized as a discontinuous point. Lidar point group data 74 is data obtained by transforming the lidar point group raw data 72 into the value in the site coordinate system. The discontinuous point is also recognized in lidar point group data 74.

Robot model generator 34A also refers to lidar structure data 84 to generate robot three-dimensional model 64A including camera posture 65 and lidar posture 73.

In environment model generator 35A, a discontinuous point extractor 47, a lidar coordinate convertor 48, a lidar point group matcher 49, and a point group selecting generator 50 are added, and camera point group matcher 46A is modified. Camera point group matcher 46A generates camera surrounding point group data 71 instead of surrounding point group data 68. Camera point group matcher 46A processes camera point group data 67 similarly to camera point group matcher 46. Camera surrounding point group data 71 is a camera surrounding environment model. The camera surrounding environment model is the surrounding environment model generated from images captured by right camera 2R and left camera 2L. Environment model generator 35A is the image processing model generator that generates the camera surrounding environment model.

Discontinuous point extractor 47 takes in lidar point group raw data 72 and processes lidar point group raw data 72 to extract the discontinuous point. Lidar coordinate convertor 48 refers to lidar posture 73 to transform lidar point group raw data 72 into lidar point group data 74 that is position data in the site coordinate system. Lidar point group matcher 49 generates lidar surrounding point group data 75. Lidar surrounding point group data 75 is data representing the direction and the distance to each thing being present as the surrounding environment. Lidar point group matcher 49 generates lidar surrounding point group data 75 by connecting lidar point group data 74 in different lidar postures 73 such that the positions of the discontinuous points are matched with each other or such that the difference in positions is made small. Different lidar posture 73 means that at least one of the position and the posture of at least one distance measuring lidar 16 is different. The average of lidar point group data 74 in the same lidar posture 73 may be taken to obtain lidar point group data 74, and lidar point group data 74 in certain lidar posture 73 may be connected to lidar point group data 74 in another lidar posture 73 to generate lidar surrounding point group data Lidar surrounding point group data 75 is ranging data including the distance and the direction to the surrounding environment. Distance measuring lidars 16R, 16L, 16B are the ranging sensors that measure the ranging data. Lidar surrounding point group data 75 is a sensor surrounding environment model. The sensor surrounding environment model is a surrounding environment model generated from the ranging data. Environment model generator 35A is the ranging data processing model generator that processes the ranging data based on the position and the ranging direction of the ranging sensor and generates the sensor surrounding environment model.

When new lidar point group data 74 is generated in a situation in which lidar surrounding point group data 75 has been generated, lidar point group matcher 49 corrects lidar surrounding point group data 75 using lidar point group data 74. When the position of the thing is changed in new lidar point group data 74, the point group data in lidar surrounding point group data 75 related to the thing is moved to the new position.

Surrounding point group data 68 in control device 3A is the point group data obtained by selecting either camera surrounding point group data 71 or lidar surrounding point group data 75. Point group selecting generator 50 selects either camera surrounding point group data 71 or lidar surrounding point group data 75 as surrounding point group data 68. When camera surrounding point group data 71 can be generated, point group selecting generator 50 sets camera surrounding point group data 71 as surrounding point group data 68.

Figure 14:
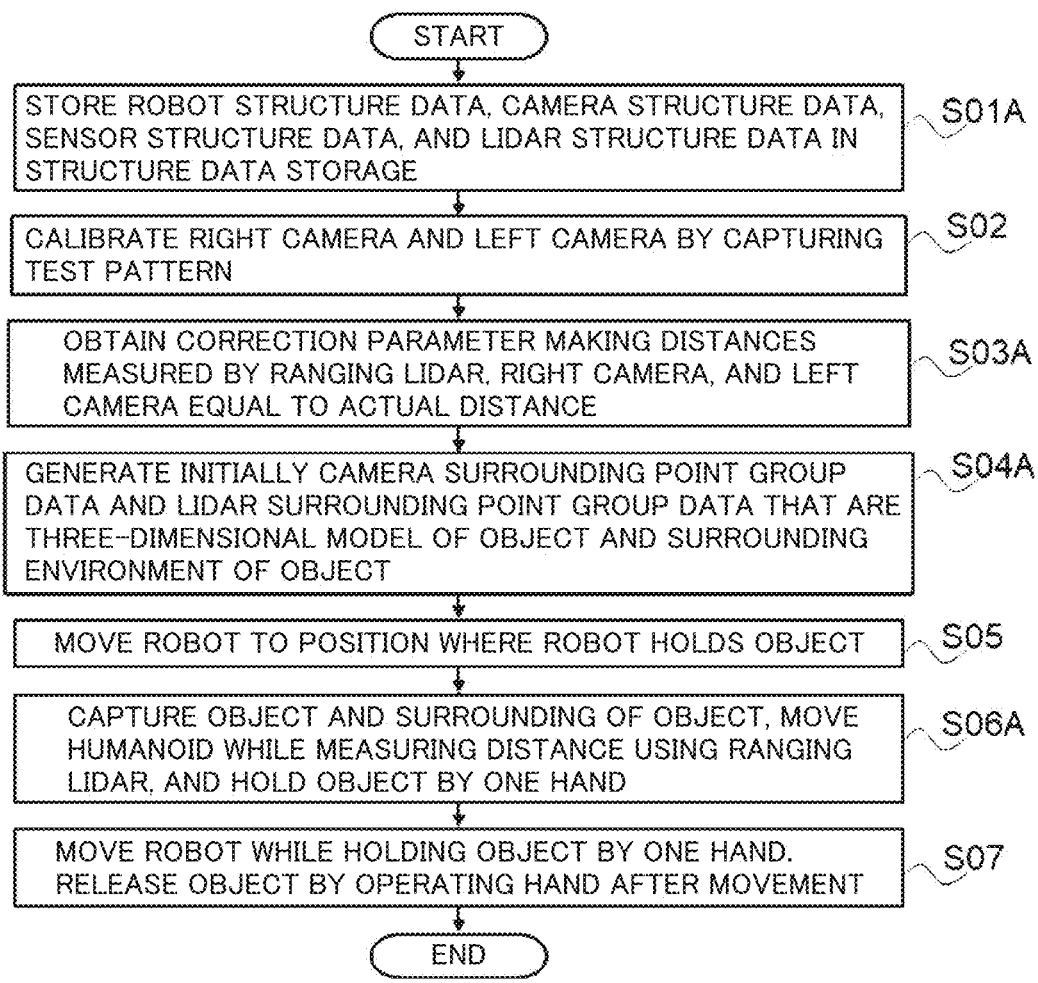
FIG. 14 is a flowchart illustrating a procedure for controlling the robot remotely using the remote control manipulator system of the second embodiment.

With reference to FIG. 14, the operation is described. FIG. 14 is a flowchart illustrating a procedure for controlling the robot remotely using the remote control manipulator system of the second embodiment. In FIG. 14, points different from FIG. 8 of the first embodiment are described.

In step S01A, lidar structure data 84 is also stored in structure data storage 32A.

In step S03A, the correction parameters are also obtained for distance measuring lidars 16R, 16L, 16B. Robot 1A is caused to take the posture for calibration, and the ruler object is disposed at a predetermined position with respect to robot 1A. Right camera 2R and left camera 2L capture the ruler object. The distance to the ruler object and the length of the ruler object are measured from the captured image. Distance measuring lidars 16R, 16L, 16B scan the space including the ruler object with the laser light, and measure the direction and the distance of the ruler object. Right camera 2R and left camera 2L capture and measure the ruler object at several distances, and distance measuring lidars 16R, 16L, 16B scan the space including the ruler object with the laser light to measure the direction and the distance of the ruler object. The conversion coefficients and the offset values of right camera 2R and left camera 2L and the conversion coefficients and the offset values of distance measuring lidars 16R, 16L, 16B are obtained such that the measured distance and length are equal to the actual distance and length.

In step S04A, camera surrounding point group data 71 and lidar surrounding point group data 75, which are the three-dimensional models of object 20 and the surrounding environment of object 20, are generated initially. With reference to the flowchart in FIG. 15, the operation in S04A is described.

Figure 16:
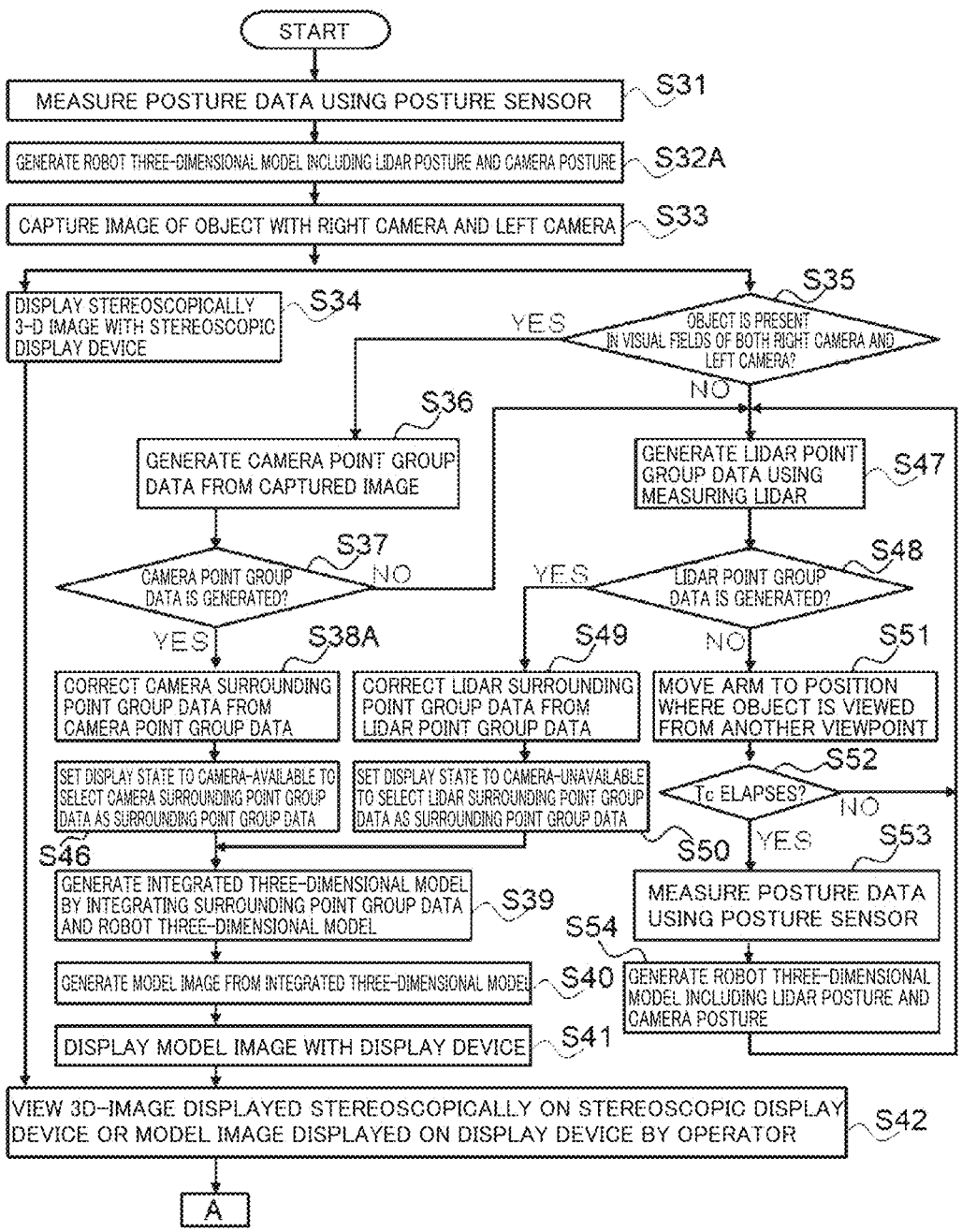
FIG. 16 is a flowchart illustrating a first half of the remote control procedure when the robot holds the object using the remote control manipulator system of the second embodiment.
Figure 17:
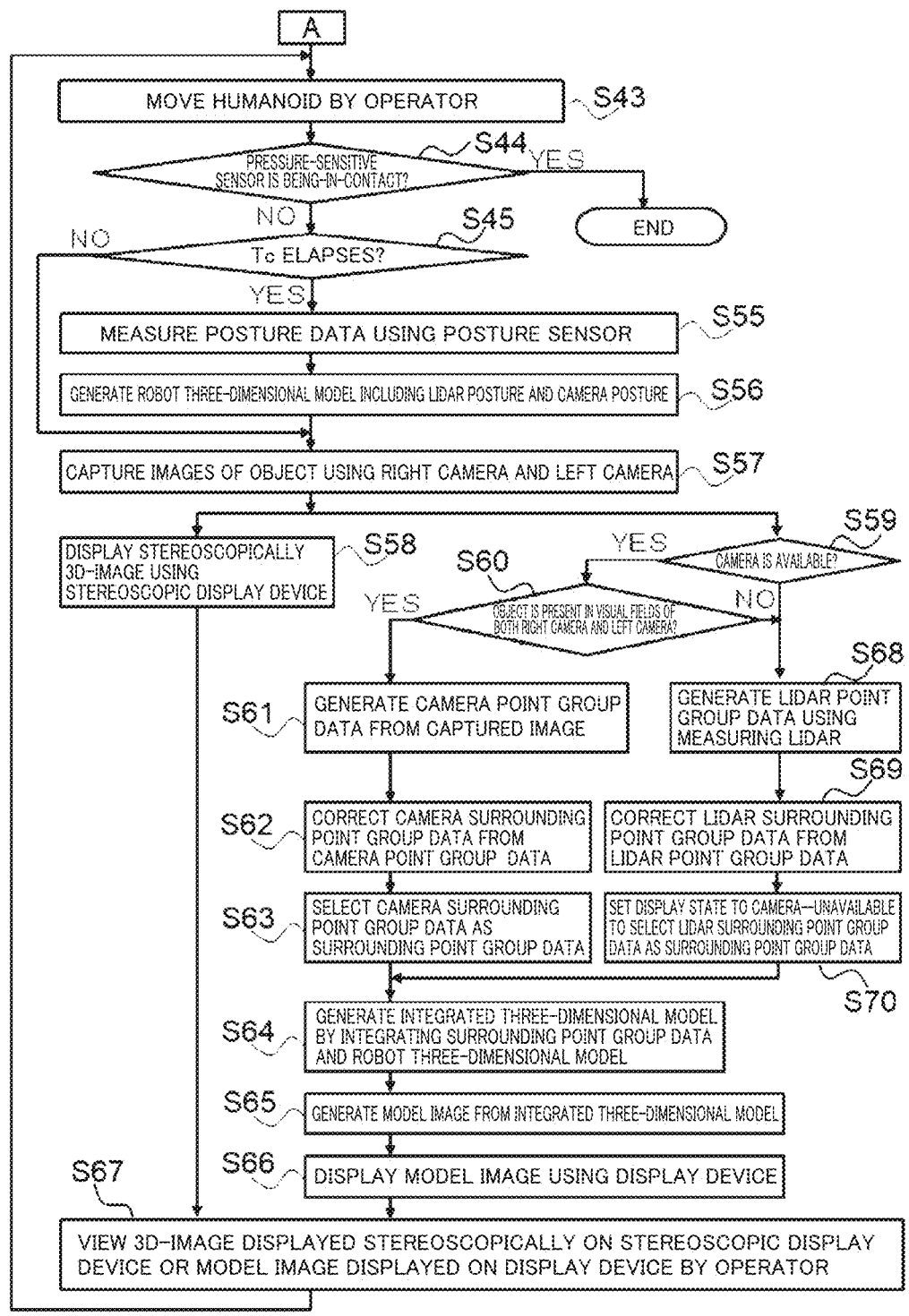
FIG. 17 is a flowchart illustrating a second half of the remote control procedure when the robot holds the object using the remote control manipulator system of the second embodiment.

In step S06A, right camera 2R and left camera 2L capture object 20 and the surroundings of object 20, and distance measuring lidars 16R, 16L, 16B scan the laser light. Operator 30 moves humanoid 1HA to hold object 20 with one hand 11E while measuring the distance. With reference to the flowcharts in FIGS. 16 and 17, the operation in S06A is described. FIGS. 16 and 17 are flowcharts illustrating a remote control procedure when the robot holds the object using the remote control manipulator system of the second embodiment. FIG. 16 is a first half of the flowchart, and FIG. 17 is a second half FIG. 16 illustrates the procedure until model image 53 is displayed for the first time. FIG. 17 illustrates the procedure until operator 30 operates arm 11J to hold object 20 while viewing 3D-image 52 and model image 53.

Figure 15:
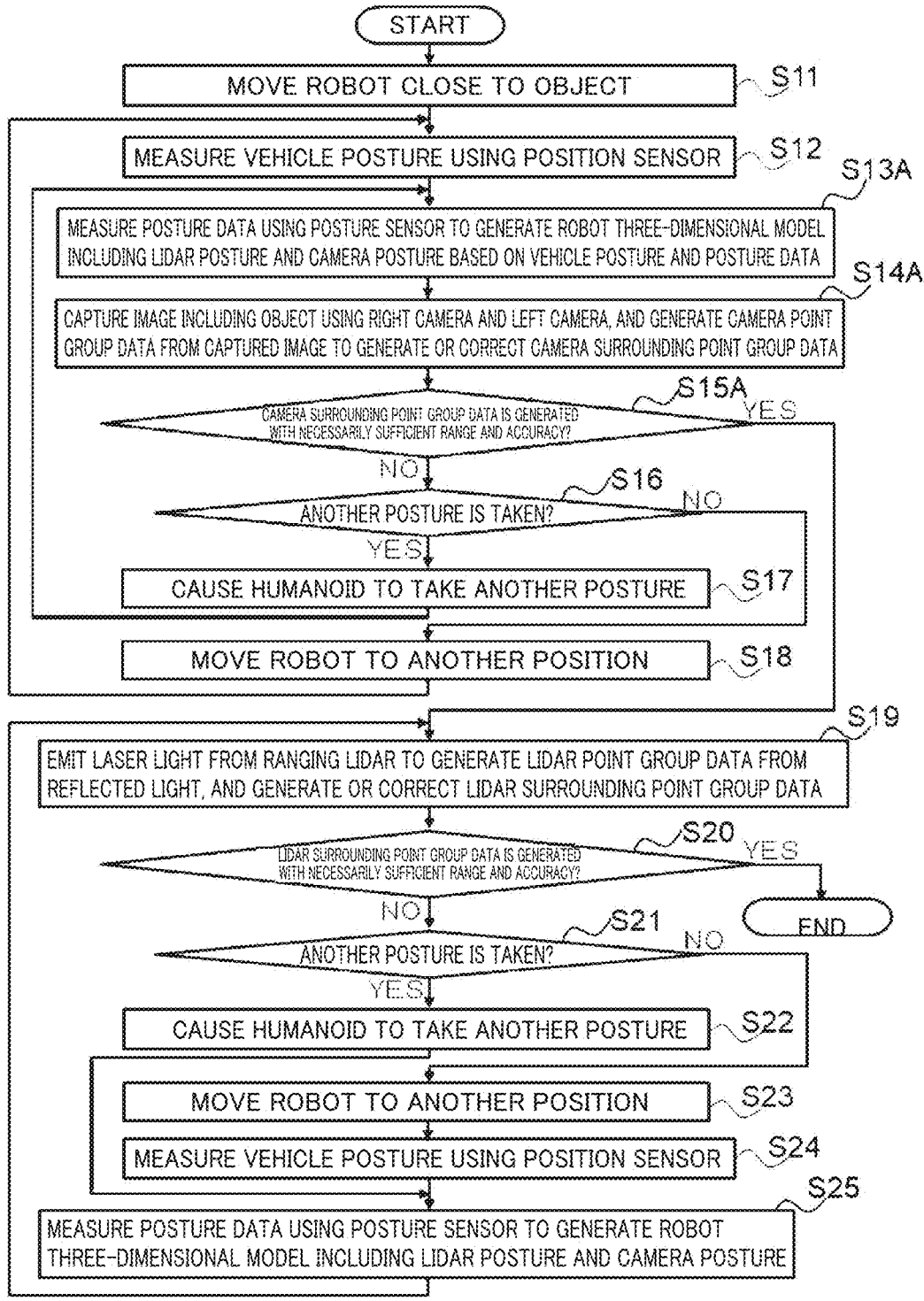
FIG. 15 is a flowchart illustrating a procedure for generating the surrounding point group data initially using the remote control manipulator system of the second embodiment.

FIG. 15 is a flowchart illustrating a procedure for generating the surrounding point group data initially using the remote control manipulator system of the second embodiment. In FIG. 15, points different from FIG. 9 of the first embodiment are described. In step S13A, posture sensor 92 measures posture data 57, and generates robot three-dimensional model 64A including lidar posture 73 and camera posture 65.

In step S14A, right camera 2R and left camera 2L capture the images including object 20, and generate or correct camera surrounding point group data 71 from the captured images. In S15A, it is checked whether camera surrounding point group data 71 is generated with the necessary and sufficient range and accuracy. S14A and S15A are different from S14 and S15 in that not surrounding point group data 68 but camera surrounding point group data 71 is to be processed.

When camera surrounding point group data 71 is generated with the necessary and sufficient range and accuracy (YES in S15A), lidar surrounding point group data is generated in steps S19 to S25. In S19, distance measuring lidars 16R, 16L, 16B emit the radar light while scanning the laser light, generate lidar point group data 74, and generate or correct lidar surrounding point group data 75.

In step S20, it is checked whether lidar surrounding point group data 75 is generated with the necessary and sufficient range and accuracy. When lidar surrounding point group data 75 is generated with the necessary and sufficient range and accuracy (YES in S20), the processing ends.

When lidar surrounding point group data 75 is not generated with the necessary and sufficient range and accuracy (NO in S20), it is checked in step S21 whether to take another posture. When taking another posture (YES in S21), humanoid 1HA is caused to take another posture in step S22.

When not taking another posture (NO in S21), robot 1 is moved to another position in step S23. In step S24, position sensor 91 measures vehicle posture 56. After execution of S24 or S22, in step S25, posture sensor 92 measures posture data 57, and generates robot three-dimensional model 64A including lidar posture 73 and camera posture 65. Then, the processing returns to S19.

In FIGS. 16 and 17, points different from FIG. 10 of the first embodiment are described. The flowcharts in FIGS. 16 and 17 are the case where either camera surrounding point group data 71 or lidar surrounding point group data 75 is set as surrounding point group data 68. In the flowcharts in FIGS. 16 and 17, camera surrounding point group data 71 is used preferentially. When camera point group data 67 cannot be generated, surrounding point group data 68 is generated only from lidar point group data 74. In a situation in which surrounding point group data 68 is generated only from lidar point group data 74, it may be checked whether camera point group data 67 can be generated. When camera point group data 67 can be generated, camera point group data 67 and camera surrounding point group data 71 may be generated, and camera surrounding point group data 71 may be used preferentially to generate surrounding point group data 68.

In step S32A, robot three-dimensional model 64A including lidar posture 73 and camera posture 65 is generated.

In step S38A, camera surrounding point group data 71 is corrected by camera point group data 67. In step S46, the display state is set to camera-available, and point group selecting generator 50 selects camera surrounding point group data 71 as surrounding point group data 68. Here, the display state is a flag that controls whether point group selecting generator 50 can select camera surrounding point group data 71. Then, in S39, model integrator 36 integrates surrounding point group data 68 and robot three-dimensional model 64A to generate an integrated three-dimensional model 69A.

When object 20 is not present in the visual fields of both right camera 2R and left camera 2L (NO in S35), or when camera point group data 67 cannot be generated (NO in S37), lidar surrounding point group data 75 is generated in steps S47 to S54. In step S47, distance measuring lidars 16R, 16L, 16B emit the laser light while scanning and measure the distance to the surrounding thing, thereby generating lidar point group data 74. When discontinuous point extractor 47 cannot extract the discontinuous point, it is judged that lidar point group data 74 cannot be generated. In step S48, it is checked whether lidar point group data 74 is generated. When lidar point group data 74 is generated (YES in S48), lidar surrounding point group data 75 is corrected by lidar point group data 74 in step S49. In step S50, the display state is set to camera-unavailable, and lidar surrounding point group data 75 is selected as surrounding point group data 68. Then, the processing goes to S39.

The case where lidar point group data 74 is not generated (NO in S48) corresponds to the case where the distance cannot be measured by the lidar due to the obstacle or the like being present in the surrounding environment. When lidar point group data 74 is not generated (NO in S48), at least one of right and left arms 11J is moved to the position where object 20 is viewed from another viewpoint such that at least one of distance measuring lidars 16R, 16L can generate lidar point group data 74 including the discontinuous point in step S51.

In step S52, it is checked whether control period Tc elapses. When Tc elapses (YES in S52), posture sensor 92 measures posture data 57 in step S53. In step S54, robot three-dimensional model 64A including camera posture 65 and lidar posture 73 is generated from vehicle posture 56 and posture data 57. After execution of S54 or when Tc does not elapse (NO in S52), the processing returns to S47.

FIG. 17 illustrating processing while operator 30 operates humanoid 1HA is described. S43 to S45 are similar to those in FIG. 10. In S43, operator 30 moves humanoid 1HA. In step S44, it is checked whether the output (tactile data 60) of pressure-sensitive sensor 95 of hand 11E is being-in-contact. That the output of pressure-sensitive sensor 95 is being-in-contact means that hand 11E is in contact with the object. When the output of pressure-sensitive sensor 95 is being-in-contact (YES in S44), the processing ends. When the output of pressure-sensitive sensor 95 is not being-in-contact (NO in S44), it is checked in S45 whether predetermined control period Tc elapses.

When Tc elapses (YES in S45), posture sensor 92 measures posture data 57 in step S55. In step S56, robot three-dimensional model 64A including camera posture and lidar posture 73 is generated from vehicle posture 56 and posture data 57. After execution of S56 or when Tc does not elapse (NO in S45), right camera 2R and left camera 2L capture the images of object 20 in step S57.

In step S58, stereoscopic display device 4 stereoscopically displays 3D-image 52. In step S59 in parallel with step S58, it is checked whether the display state is camera-available. When the display state is the camera-available (YES in S59), whether object 20 is present in the visual fields of both right camera 2R and left camera 2L is checked in step S60. When object 20 is present in the visual fields of both right camera 2R and left camera 2L (YES in S60), camera point group data 67 is generated from the captured image in step S61. In step S62, camera surrounding point group data 71 is corrected by camera point group data 67. In step S63, camera surrounding point group data 71 is selected as surrounding point group data 68. In step S64, surrounding point group data 68 and robot three-dimensional model 64A are integrated to generate integrated three-dimensional model 69. In step S65, model image 53 is generated from integrated three-dimensional model 69. In step S66, display device 5 displays model image 53. In step S67, operator 30 views 3D-image 52 stereoscopically displayed on stereoscopic display device 4 or model image 53 displayed on display device 5. Then, the processing returns to S43.

When the display state is not the camera-available (NO in S59), or when object is not present in the visual fields of at least one of right camera 2R and left camera 2L (NO in S60), in step S68, distance measuring lidars 16R, 16L, 16B emit the laser light while scanning the laser light, measure the distance, and generate lidar point group data 74. In step S69, lidar surrounding point group data 75 is corrected by lidar point group data 74. In step S70, the display state is set to camera-unavailable, and point group selecting generator 50 selects lidar surrounding point group data 75 as surrounding point group data 68. Then, the processing goes to S64.

Also in remote control manipulator system 100A, operator 30 can freely view stereoscopically-displayed 3D-image 52 and model image 53 while switching between stereoscopically-displayed 3D-image 52 and model image 53. Model image 53 is the image of robot 1 and object 20 viewed from the viewpoint designated by operator 30. Operator 30 can control robot 1A remotely to perform the work such as pushing, pulling, and holding object 20 more accurately and easily than before. In other points, remote control manipulator system 100A operates similarly to remote control manipulator system 100, and a similar effect can be obtained.

Because robot 1A includes distance measuring lidar 16, remote control manipulator system 100A can generate the surrounding environment model, which is the three-dimensional model of object 20 and the surrounding environment of object more easily and accurately than remote control manipulator system 100.

Lidar surrounding point group data 75 may be used preferentially as the surrounding point group data. The surrounding point group data may be point group data generated from both camera surrounding point group data 71 and lidar surrounding point group data 75. Point group selecting generator 50 selects either camera surrounding point group data 71 or lidar surrounding point group data 75 as surrounding point group data 68. Alternatively, point group selecting generator 50 generates surrounding point group data 68 from both camera surrounding point group data 71 and lidar surrounding point group data 75. Point group selecting generator 50 selects at least one of camera surrounding point group data 71 and lidar surrounding point group data 75 to generate surrounding point group data 68.

The point group selecting generator may take the average of camera surrounding point group data 71 and lidar surrounding point group data 75 to obtain surrounding point group data 68. Alternatively, the point group selecting generator may select camera surrounding point group data 71 for a part of surrounding point group data 68, and select lidar surrounding point group data 75 for another part. When both camera surrounding point group data 71 and lidar surrounding point group data 75 are inputted to the point group selecting generator, surrounding point group data 68 generated by the point group selecting generator is referred to as a merged surrounding environment model in which camera surrounding point group data 71 and lidar surrounding point group data 75 are merged. In this case, the point group selecting generator is the surrounding environment model merger that generates surrounding point group data 68 that is the merged surrounding environment model. The point group selecting generator may generate surrounding point group data 68 that does not have a part generated from both camera surrounding point group data 71 and lidar surrounding point group data 75. Surrounding point group data 68 may not have a part that is camera surrounding point group data 71. Surrounding point group data 68 may not have a part that is lidar surrounding point group data 75.

Both camera surrounding point group data 71 and lidar surrounding point group data 75 may be selected as the surrounding point group data to generate the integrated three-dimensional model. Both camera surrounding point group data 71 and lidar surrounding point group data 75 are displayed in the model image generated based on the integrated three-dimensional model. In the case of displaying both, the display color of the image is changed between camera surrounding point group data 71 and lidar surrounding point group data 75, and both images are set as images that are transparent. By being the transparent image, both the images of camera surrounding point group data 71 and lidar surrounding point group data 75 can be viewed, and robot 1A and the surrounding environment behind camera surrounding point group data 71 and lidar surrounding point group data 75 can also be viewed.

Operator 30 may be enabled to input instructions to select which of camera surrounding point group data 71 or lidar surrounding point group data 75 to display preferentially, to display both, or to display the merged surrounding environment model that is a merge of camera surrounding point group data 71 and lidar surrounding point group data 75. After the processing of handling object 20 is started, operator 30 may change the displaying method.

The environment model generator may generate only lidar surrounding point group data 75 without generating the camera surrounding point group data by the image processing. In this case, the environment model generator includes a model integrator that integrates lidar surrounding point group data 75 that is the surrounding environment model and robot three-dimensional model 64A.

The ranging sensor that measures the distance to a surrounding object by emitting a radio wave or an ultrasonic wave may be used instead of the distance measuring lidar. Any ranging sensor may be used as long as the distance to the object for each direction can be measured with the necessary and sufficient scan angle range and angle resolution.

The above is also applied to other embodiments.

Third Embodiment

Figure 18:
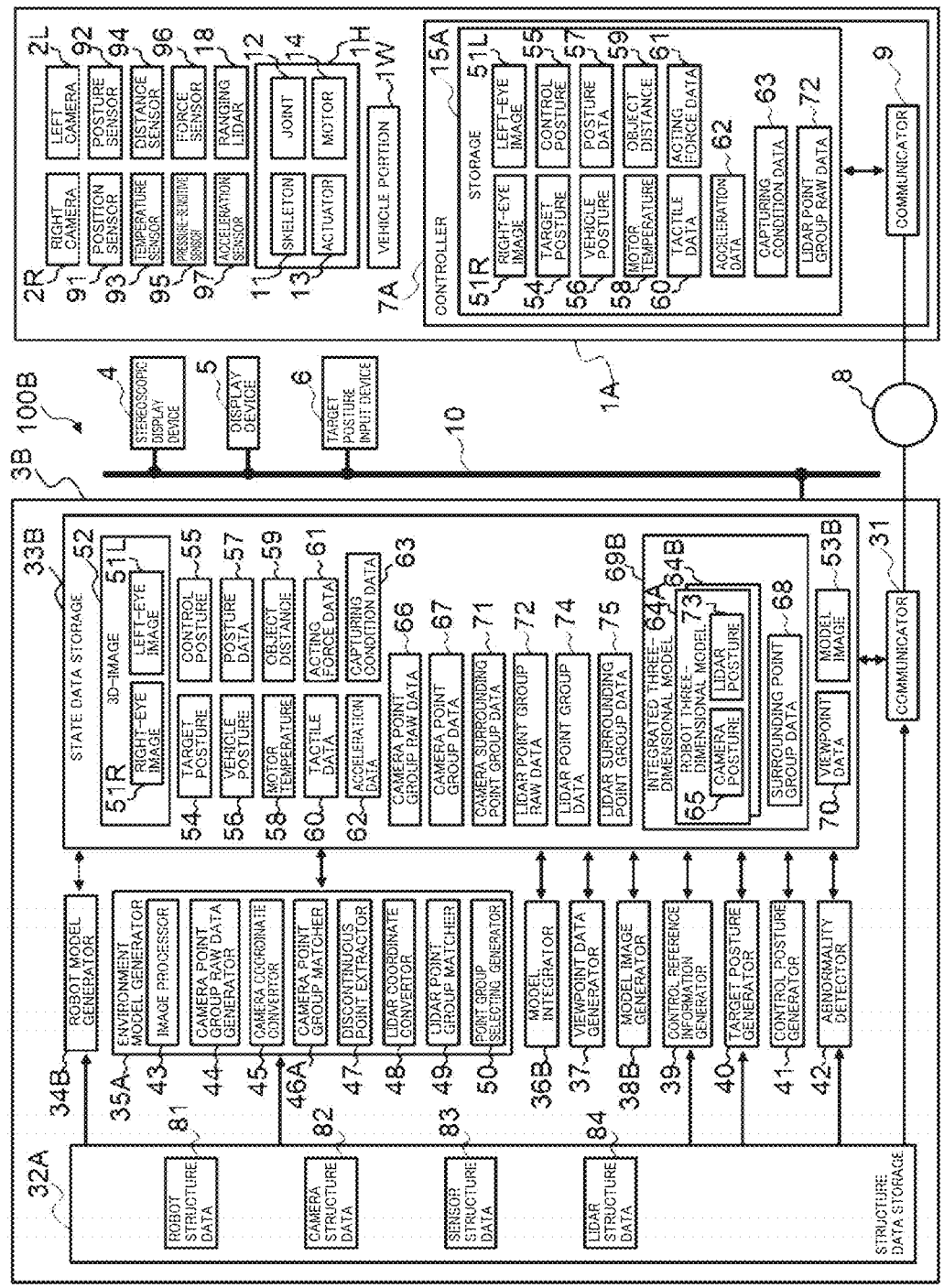
FIG. 18 is a block diagram illustrating a functional configuration of a remote control manipulator system according to a third embodiment.

A third embodiment is the case where the second embodiment is changed so as to generate the three-dimensional model of the robot based on the target posture. The target posture is data representing the posture of robot 1A to be taken after execution of the control intended by operator 30. With reference to FIG. 18, a configuration of a remote control manipulator system of the third embodiment is described. FIG. 18 is a block diagram illustrating a functional configuration of the remote control manipulator system of the third embodiment.

In FIG. 18 illustrating the functional configuration of a remote control manipulator system 100B, points different from FIG. 13 in the second embodiment are described. In a control device 3B included in remote control manipulator system 100B, a state data storage 33B, a robot model generator 34B, a model integrator 36B, and a model image generator 38B are modified.

State data storage 33B stores two robot three-dimensional models 64A, 64B. State data storage 33B stores an integrated three-dimensional model 69B and a model image 53B. Robot three-dimensional model 64A is the three-dimensional model of robot 1A generated based on posture data 57 representing the current posture of robot 1A. Robot three-dimensional model 64B is the three-dimensional model of robot 1A generated based on target posture 54. Target posture 54 is data representing the position and posture of robot 1A after execution of the operation instruction inputted by operator 30. Integrated three-dimensional model 69B and model image 53B are generated based on robot three-dimensional model 64B. For easy understanding of the description, robot three-dimensional model 64A is referred to as current three-dimensional model 64A, and robot three-dimensional model 64B is referred to as a target three-dimensional model 64B. Target three-dimensional model 64B is the three-dimensional model in which robot 1A takes target posture 54 inputted by operator 30. Target three-dimensional model 64B is a target manipulator model that is the manipulator model to be taken after robot 1A performs the operation according to the operation instruction. Model image 53B is an image of robot 1A taking target posture 54 viewed from the designated viewpoint.

Camera coordinate convertor 45 transforms camera point group raw data 66 into camera point group data 67 based on camera posture 65 included in current three-dimensional model 64A. Lidar coordinate convertor 48 transforms lidar point group raw data 72 into lidar point group data 74 based on lidar posture 73 included in current three-dimensional model 64A.

Integrated three-dimensional model 69B is data representing the three-dimensional model obtained by integrating target three-dimensional model 64B and surrounding point group data 68 representing the current surrounding environment. State data storage 33B does not store the integrated three-dimensional model in which current three-dimensional model 64A and surrounding point group data 68 are integrated. Model image 53B is an image of integrated three-dimensional model 69B viewed from the viewpoint designated by viewpoint data 70. Model image 53B is displayed on display device 5.

Robot model generator 34B refers to posture data 57 to generate current three-dimensional model 64A, and refers to target posture 54 to generate target three-dimensional model 64B. Robot model generator 34B is the target manipulator model generator that generates a target manipulator model.

Model integrator 36B generates integrated three-dimensional model 64B by integrating target three-dimensional model 69B with surrounding point group data 68.

Model image generator 38B generates model image 53B using integrated three-dimensional model 69B.

Figure 19:
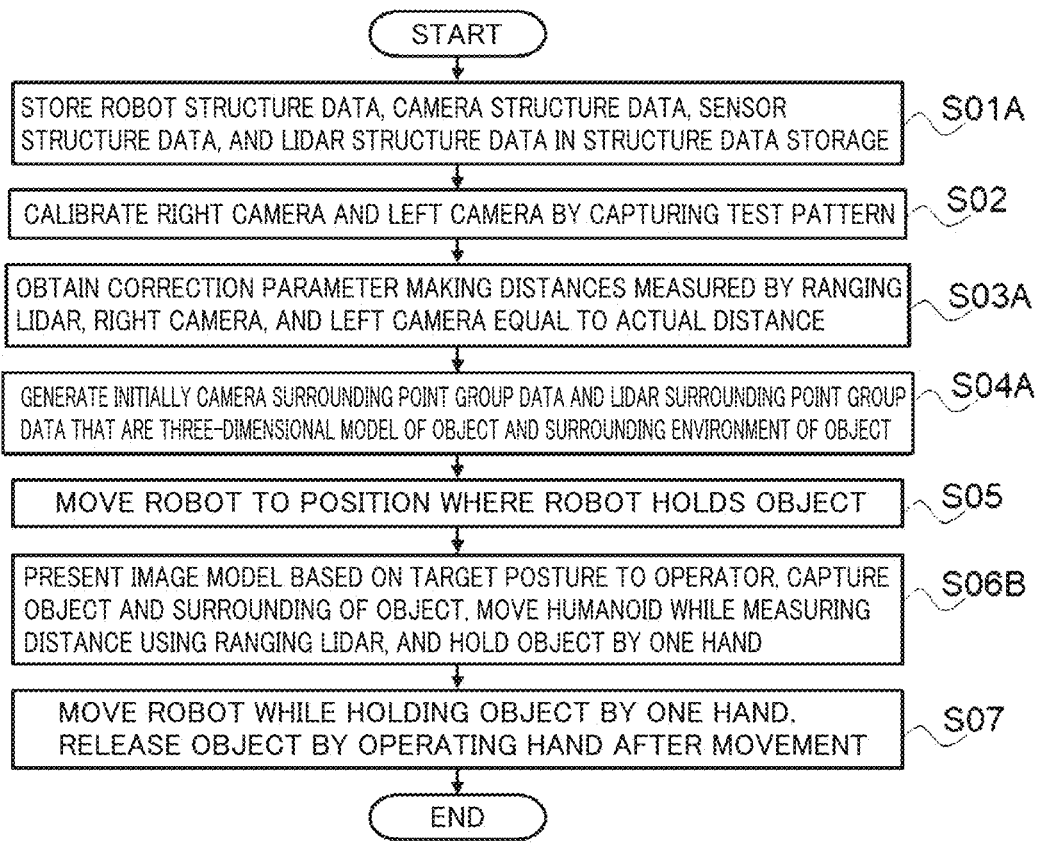
FIG. 19 is a flowchart illustrating a procedure for controlling the robot remotely using the remote control manipulator system of the third embodiment.

With reference to FIG. 19, the operation is described. FIG. 19 is a flowchart illustrating a procedure for controlling the robot remotely using the remote control manipulator system of the embodiment. In FIG. 19, points different from FIG. 14 of the second embodiment are described.

When surrounding point group data 68 is generated initially, model image 53B is not presented to operator 30, and thus S04A is not changed. When model image 53B is presented when surrounding point group data 68 is generated initially, S04A is changed. In the flowchart executing changed S04A, the flowchart describing the procedure for generating surrounding point group data 68 initially in FIG. 15 is modified as follows. In S13A and S25, robot model generator 34B generates current three-dimensional model 64A including lidar posture 73 and camera posture 65 and target three-dimensional model 64B. A procedure for displaying model image 53B on display device 5 is added as a procedure subsequent to S13A or S25.

Figure 20:
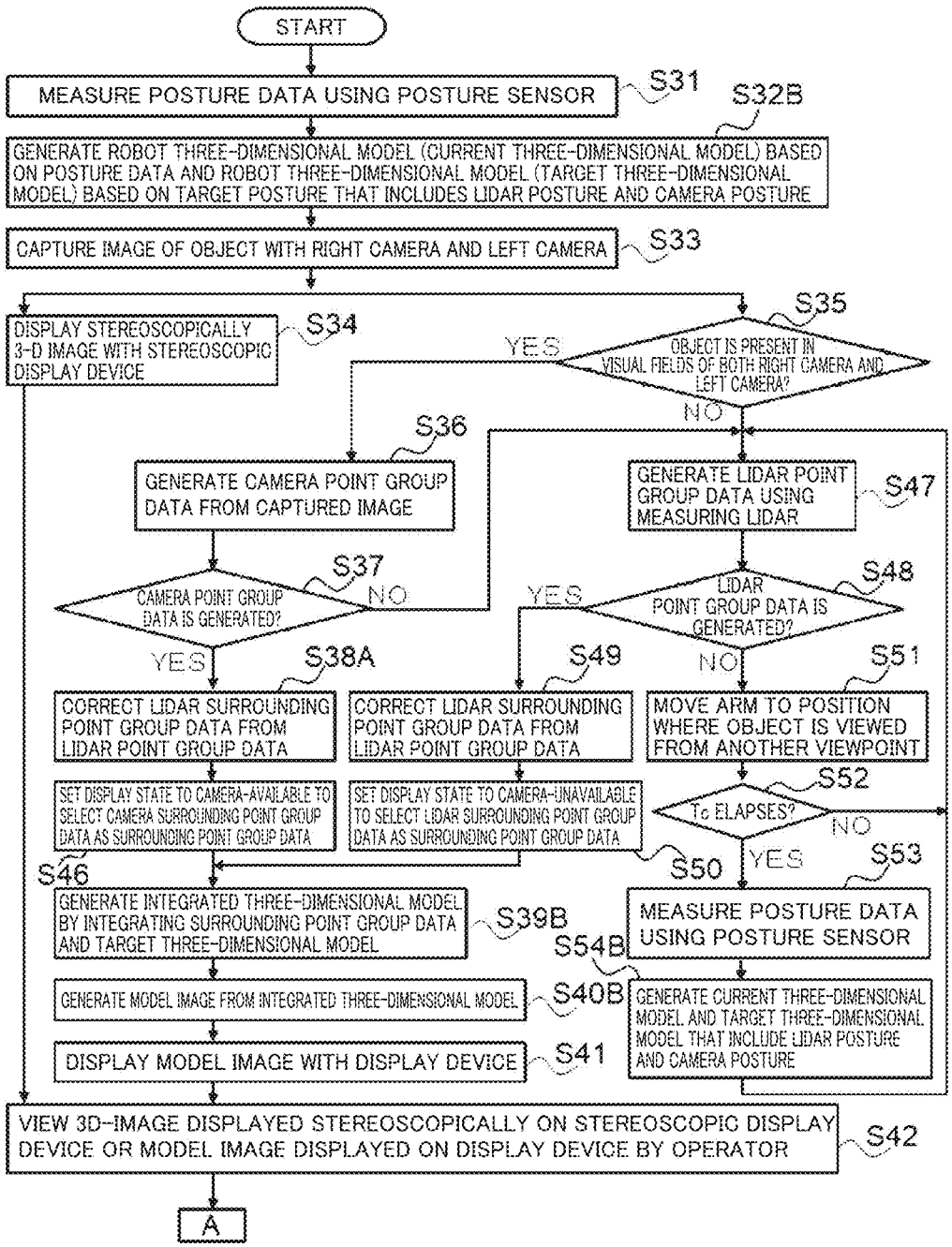
FIG. 20 is a flowchart illustrating a first half of the remote control procedure when the robot holds the object using the remote control manipulator system of the third embodiment.
Figure 21:
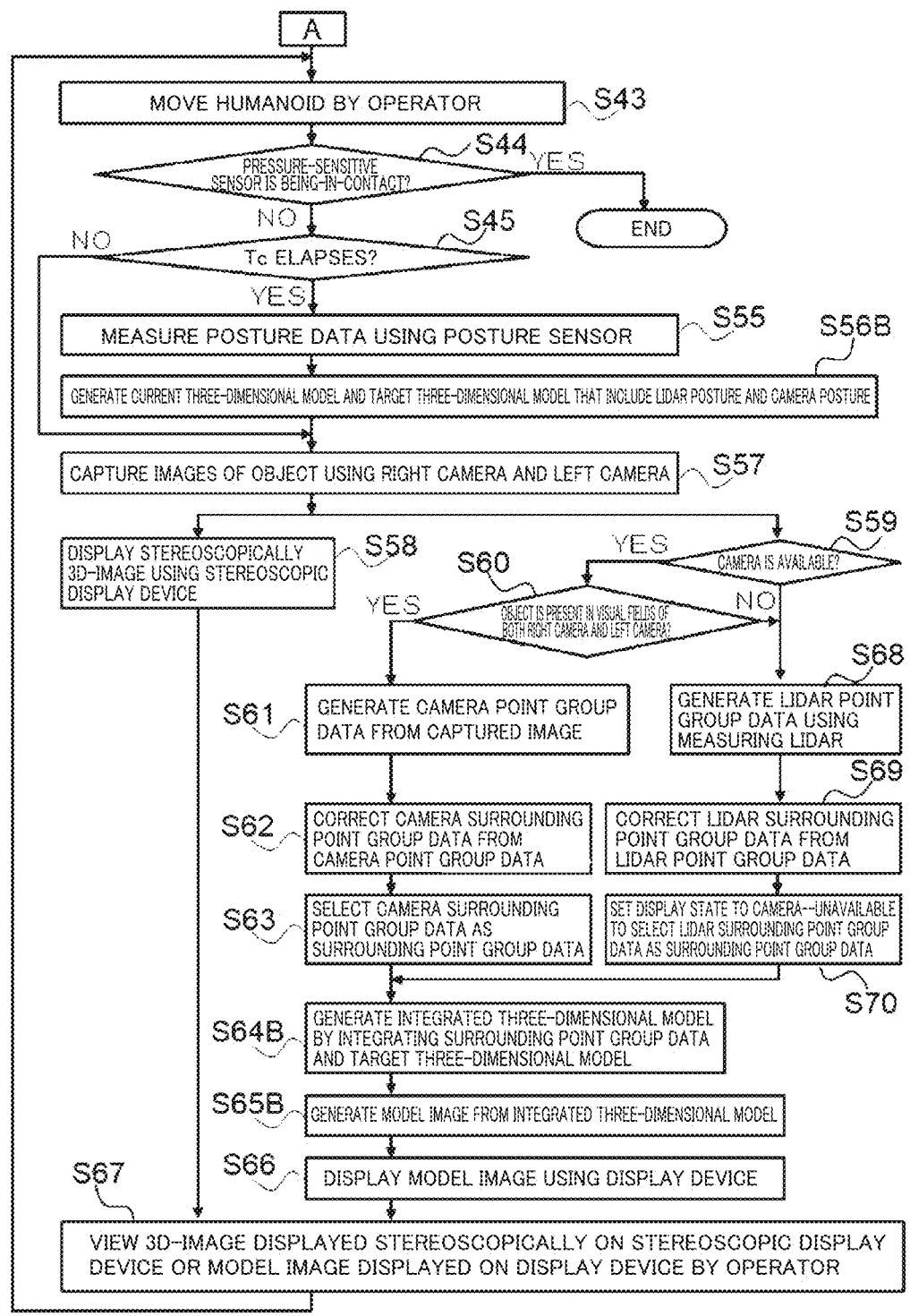
FIG. 21 is a flowchart illustrating a second half of the remote control procedure when the robot holds the object using the remote control manipulator system of the third embodiment.

Step S06B is different from step S06A in that model image 53B based on target posture 54 is presented to operator 30. In S06B, right camera 2R and left camera 2L capture object 20 and the surroundings of object 20, and operator 30 moves humanoid 1HA to hold object 20 with one hand 11E while distance measuring lidars 16R, 16L, 16B scanning the laser beam and measuring the distance. With reference to the flowcharts in FIGS. 20 and 21, the operation in S06B is described. FIGS. 20 and 21 are flowcharts illustrating a remote control procedure when the robot holds the object using the remote control manipulator system of the third embodiment.

In steps S32B, S54B, S56B, robot model generator 34B generates current three-dimensional model 64A and target three-dimensional model 64B including lidar posture 73 and camera posture 65.

In steps S39B, S64B, model integrator 36B integrates target three-dimensional model 64B and surrounding point group data 68 to generate integrated three-dimensional model 69B.

In steps S40B, S65B, model image generator 38B generates model image 53B using integrated three-dimensional model 69B.

The processing for transforming camera point group raw data 66 into camera point group data 67, such as S36, uses camera posture 65 included in current three-dimensional model 64A similarly to the case of the second embodiment. The processing for transforming lidar point group raw data 72 into lidar point group data 74, such as S47, also uses lidar posture 73 included in current three-dimensional model 64A.

Also in remote control manipulator system 100B, operator 30 can freely view stereoscopically-displayed 3D-image 52 and model image 53B while switching between stereoscopically-displayed 3D-image 52 and model image 53B. Model image 53B is the image of robot 1 and object 20 viewed from the viewpoint designated by operator 30. Operator 30 can control robot 1A remotely to perform the work such as pushing, pulling, and holding object 20 more accurately and easily than before. Otherwise, remote control manipulator system 100B operates similarly to remote control manipulator system 100, and a similar effect can be obtained.

Model image 53B viewed and recognized by operator 30 is generated based on target three-dimensional model 64B based on target posture 54. Operator 30 can recognize the posture of robot 1A to be taken after executing the operation before robot 1A actually moves. In remote control manipulator system 100B, operator 30 can be prevented from inputting target posture 54 that causes robot 1A to perform excessive movement.

In remote control manipulator systems 100, 100A, operator 30 may move robot 1A too much due to the influence of the delay time of the communication, the signal processing, or the like. Specifically, even though operator 30 already inputs appropriate target posture 54, sometimes model image 53 displays the posture in the way of robot 1A taking target posture 54. Operator 30 who looks at such model image 53 sometimes make the input to cause robot 1A to take a posture further moved from target posture 54. As a result, when robot 1A is moved too much and in case of holding soft object 20, object 20 may be deformed or damaged by being held by robot 1A. In case of holding hard object 20, hand 11E comes into contact with object 20 earlier than expected in operating robot 1A, and it is considered that the smooth operation is difficult to perform.

A model image in which both current three-dimensional model 64A representing the current posture of robot 1A and target three-dimensional model 64B representing the target posture that is the posture being the control target may be displayed simultaneously by changing the display color or shading as the model image. When both current three-dimensional model 64A and target three-dimensional model 64B are displayed simultaneously in the model image, the model integrator selects both current three-dimensional model 64A and target three-dimensional model 64B to generate the integrated three-dimensional model. Operator 30 may select and display any one of model image 53 representing the current posture of robot 1A, model image 53B representing the target posture of robot 1A, and the model image displaying simultaneously the current posture and the target posture of robot 1A. In this case, the model integrator selects one or both of current three-dimensional model 64A and target three-dimensional model 64B to generate the integrated three-dimensional model. The model integrator may generate the integrated three-dimensional model in which current three-dimensional model 64A and surrounding point group data 68 are integrated, the integrated three-dimensional model in which target three-dimensional model 64B and surrounding point group data 68 are integrated, and the integrated three-dimensional model in which current three-dimensional model 64A and target three-dimensional model 64B and surrounding point group data 68 are integrated.

The surrounding environment model may also allow operator 30 to select to display either camera surrounding point group data 71 generated from the image or lidar surrounding point group data 75 based on the ranging data of distance measuring lidar 16 in a switched manner, or to display camera surrounding point group data 71 and lidar surrounding point group data 75 in a distinguishable manner at the same time.

The above is also applied to other embodiments.

Fourth Embodiment

Figure 22:
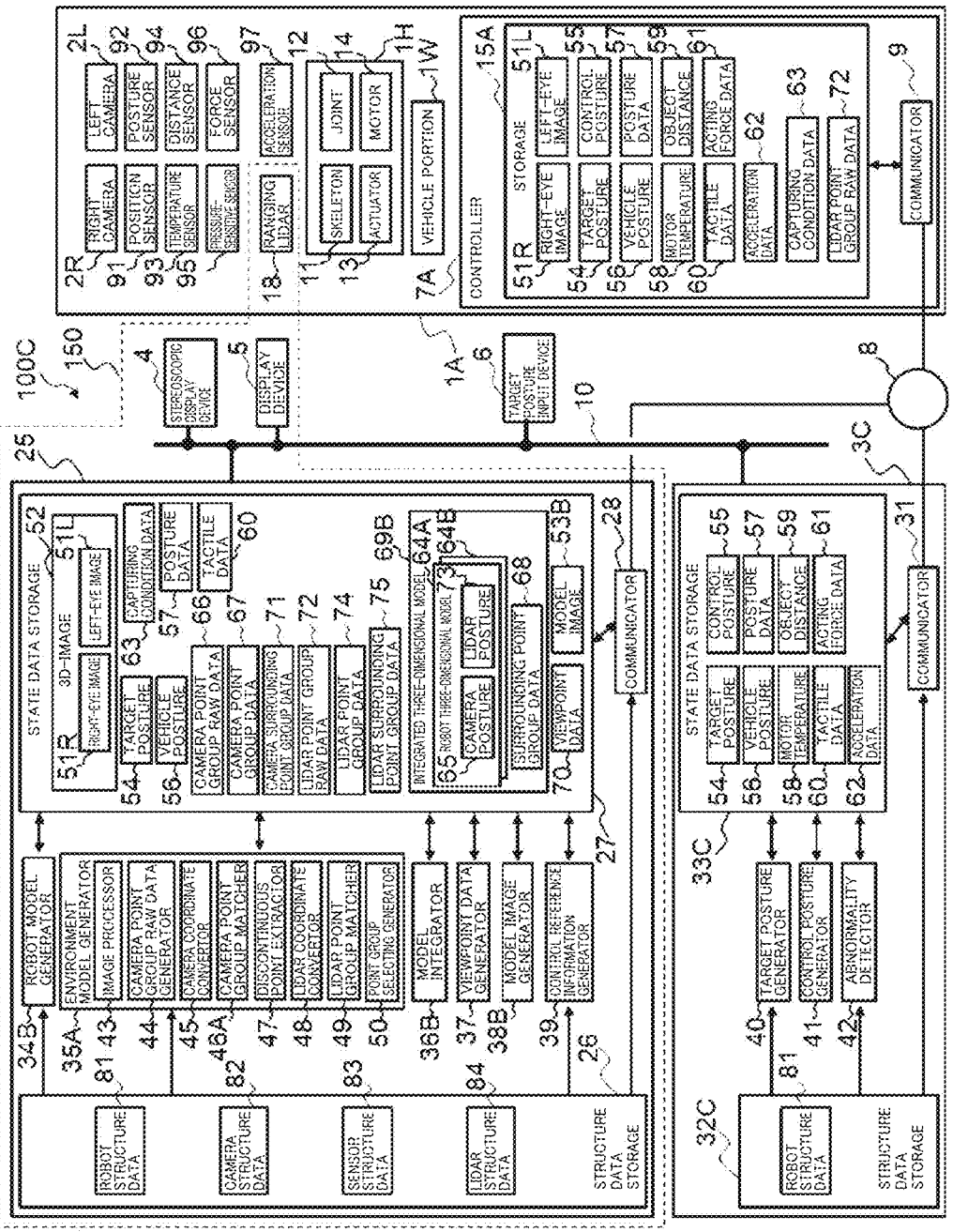
FIG. 22 is a block diagram illustrating a functional configuration of a remote control manipulator system and a remote control assistance system according to a fourth embodiment.

A fourth embodiment is the case where a remote control manipulator system equivalent to the third embodiment is configured by adding a remote control assistance system to the existing remote control manipulator system. FIG. 22 is a block diagram illustrating a functional configuration of the remote control manipulator system and the remote control assistance system of the fourth embodiment. In FIG. 22, points different from FIG. 18 of the third embodiment are described.

For example, the existing remote control manipulator system is a system in which operator 30 wears a head mount display (HMD). A remote control manipulator system 100C is configured by replacing the HMD with stereoscopic display device 4 and adding an assistance device 25, distance measuring lidar 16, display device 5, and the like to the existing system.

Robot 1A, a control device 3C, and target posture input device 6 are the same as those in the existing system or modified as necessary. In robot 1A, distance measuring lidars 16R, 16L, 16B are mounted on existing robot 1.

Control device 3C is configured by modifying the existing control device to have a function of sending target posture 54 to assistance device 25.

Control device 3C has a function of controlling robot 1A remotely. Assistance device 25 has a function of generating model image 53B and displaying the model image on display device 5. Model image 53B is the image of integrated three-dimensional model 64B obtained by integrating robot three-dimensional model 69B taking the target posture and surrounding point group data 68, viewed from an arbitrary viewpoint. Assistance device 25 has a function of causing stereoscopic display device 4 to stereoscopically display 3D-image 52. Control device 3C may output 3D-image 52 to stereoscopic display device 4 instead of outputting to the HMD. Right-eye image 51R and left-eye image 51L may be inputted to stereoscopic display device 4 without through the control device and the assistance device, and stereoscopic display device 4 may stereoscopically display inputted right-eye image 51R and left-eye image 51L.

A remote control assistance system 150 is composed of assistance device 25, distance measuring lidar 16, stereoscopic display device 4, and display device 5. In FIG. 22, the range of remote control assistance system 150 is indicated by a broken line.

Assistance device 25 includes a structure data storage 26, a state data storage 27, a communicator 28, a robot model generator 34B, environment model generator 35A, model integrator 36B, viewpoint data generator 37, model image generator 38B, and control reference information generator 39.

Structure data storage 26 includes robot structure data 81, camera structure data 82, sensor structure data 83, and lidar structure data 84. Structure data storage 26 is similar to structure data storage 32A in the third embodiment.

State data storage 27 stores 3D-image 52 including right-eye image 51R and left-eye image 51L, model image 53B, target posture 54, vehicle posture 56, posture data 57, tactile data 60, capturing condition data 63, and robot three-dimensional models 64A, 64B. Target posture 54, vehicle posture 56, posture data 57, and capturing condition data 63 are used to generate robot three-dimensional models 64A, 64B. Tactile data 60 is used to determine whether hand 11E is in contact with object 20. Robot three-dimensional models 64A, 64B include camera posture 65 and lidar posture 73. State data storage 27 further stores camera point group raw data 66, camera point group data 67, surrounding point group data 68, integrated three-dimensional model 69B, viewpoint data 70, camera surrounding point group data 71, lidar point group raw data 72, lidar point group data 74, and lidar surrounding point group data 75.

Communicator 28 communicates with robot 1A and control device 3C. Communicator 28 receives vehicle posture 56, posture data 57, tactile data 60, capturing condition data 63, right-eye image 51R, left-eye image 51L, and lidar point group raw data 72 that are sent from communicator 9 included in robot 1A, and receives target posture 54 sent from communicator 31 included in control device 3C. Communicator 31 may transfer received vehicle posture 56, posture data 57, and tactile data 60 to communicator 28.

Control device 3C includes data and a processor that control robot 1A remotely. Control device 3C includes communicator 31, a structure data storage 32C, a state data storage 33C, target posture generator 40, control posture generator 41, and abnormality detector 42. State data storage 32C stores robot structure data 81 and sensor structure data 83. State data storage 33C stores target posture 54, control posture 55, vehicle posture 56, posture data 57, motor temperature 58, object distance 59, tactile data 60, acting force data 61, and acceleration data 62.

Remote control manipulator system 100C including remote control assistance system 150 operates similarly to remote control manipulator system 100B, and a similar effect can be obtained.

According to remote control assistance system 150, operator 30 can freely switch between stereoscopically-displayed 3D-image 52 and model image 53B through moving the head of operator 30 to view stereoscopically-displayed 3D-image 52 and model image 53. Model image 53B is the image of robot 1 and object 20 viewed from the viewpoint designated by operator 30. By viewing the image and information that are used to assist the remote control provided by remote control assistance system 150, operator 30 can control robot 1 remotely to perform the operations such as pushing, pulling, and holding the target object more accurately and easily than before.

The remote control assistance system according to the present disclosure can also be applied to the case where a remote control manipulator system similar to the first or second embodiment or another remote control manipulator system is configured. Even in a remote control manipulator system in which the control device and the assistance device are not implemented as separate computers, the remote control manipulator system includes a part that is the remote control assistance system. The part that is the remote control assistance system is a part including a stereoscopic display device, a functional module that generates model image 53B that is the image of the three-dimensional model of the robot and the surrounding environment viewed from the viewpoint designated by operator 30, and the display device that displays model image 53B.

When the remote control assistance system is added to the existing remote control manipulator system that is not provided with stereoscopic vision, the right camera and the left camera are included in the remote control assistance system.

Lidar point group raw data 72 measured by distance measuring lidars 16R, 16L, 16B may be sent to assistance device 25 by a dedicated communication device. In this case, storage 15A included in controller 7A does not store the lidar point group raw data 72. Robot 1A is different from robot 1 only in that distance measuring lidars 16R, 16L, 16B as hardware are mounted. Robot 1A is controlled remotely similarly to robot 1 on which distance measuring lidars 16R, 16L, 16B are not mounted.

A free combination of the embodiments, a modification of the embodiments, omission of some components, or a free combination of the embodiments in which some components are omitted or modified can be made.

REFERENCE SIGNS LIST 100, 100A, 100B, 100C: remote control manipulator system
150: remote control assistance system
20: object
30: operator (operator)
1, 1A: crawler mobile robot (robot, manipulator)
1W: vehicle portion
1H, 1HA: humanoid
2R: right camera
2L: left camera
3, 3A, 3B: control device
4: stereoscopic display device
5: display device (model image display device)

6: target posture input device (operation instruction inputter)
6H: upper body target posture inputter
6W: vehicle posture inputter
7: controller
8: communication line
9: communicator
10: LAN
11: skeleton
11A: trunk
11B: arm base
11C: upper arm
11D: forearm
11E: hand
11F: head
11G: leg
11H: body connection portion
11J: arm
12: joint
12A: shoulder joint
12B: elbow joint
12C: wrist joint
12D: neck joint
12E: leg base joint
12F: leg tip joint
12G: body joint
13: actuator
14: motor
15A: storage
16R, 16L, 16B: distance measuring lidar (ranging sensor)
21: CPU
22: memory
23: CPU
24: memory
25: assistance device
26: structure data storage
27: state data storage
28: communicator
31: communicator
32, 32A, 32C: structure data storage
33, 33A, 33B, 33C: state data storage
34, 34A: robot model generator (manipulator model generator)
34B: robot model generator (manipulator model generator, target manipulator model generator)
35: environment model generator (image processing model generator)
35A: environment model generator (Image processing model generator, ranging data processing model generator)
36, 36B: model integrator
37: viewpoint data generator
38, 38B: model image generator
39: control reference information generator
40: target posture generator
41: control posture generator (control signal generator)
42: abnormality detector
43: image processor
44: camera point group raw data generator
45: camera coordinate convertor
46, 46A: camera point group matcher
47: discontinuous point extractor
48: lidar coordinate convertor
49: lidar point group matcher
50: point group selecting generator (surrounding environment model merger)
51R: right eye image
51L: left eye image
52: 3D-image (stereoscopic image)
53, 53B: model image
54: target posture (operation instruction)
55: control posture (control signal)
56: vehicle posture (position and posture information)
57: posture data (position and posture information)
58: motor temperature
59: object distance
60: tactile data
61: action force data
62: acceleration data
63: capturing condition data
64, 64A: robot three-dimensional model (current three-dimensional model, manipulator model)
64B: robot three-dimensional model (target three-dimensional model, target manipulator model)
65: camera posture
66: camera point group raw data
67: camera point group data
68: surrounding point group data (surrounding environment model, merged surrounding environment model)
69, 69A, 69B: integrated three-dimensional model
70: viewpoint data
71: camera surrounding point group data
72: lidar point group raw data
73: lidar posture
74: lidar point group data
75: lidar surrounding point group data
81: robot structure data (manipulator structure data)
82: camera structure data
83: sensor structure data
84: lidar structure data (ranging sensor structure data)
91: position sensor (position and posture sensor)
92: posture sensor (position and posture sensor)
93: temperature sensor
94: distance sensor
95: pressure-sensitive sensor
96: force sensor
97: acceleration sensor

The invention claimed is:

1. A remote control manipulator system comprising:
a manipulator controlled by an operator remotely to handle an object;
an operation instruction inputter through which the operator inputs an operation instruction instructing an operation of the manipulator to move or to be still;
a control signal generator to generate a control signal controlling the manipulator from the operation instruction;
a right camera and a left camera mounted on the manipulator, the right camera and the left camera having a predetermined positional relationship;
a stereoscopic display device to display a right-eye image captured by the right camera and a left-eye image captured by the left camera to be viewed stereoscopically;
a position and posture sensor to detect position and posture information representing a position and a posture of the manipulator;
a structure data storage to store manipulator structure data representing a structure of the manipulator and camera structure data representing structures of the right camera and the left camera;
a manipulator model generator to generate a manipulator model being a three-dimensional model of the manipulator including the right camera and the left camera by referring to the manipulator structure data, the camera structure data, and the position and posture information;

an image processing model generator to perform image processing on the right-eye image and the left-eye image based on positions and capturing directions of the right camera and the left camera included in the manipulator model to generate a surrounding environment model being a three-dimensional model of the object and a surrounding environment being a thing being present around the object;

a model integrator to generate an integrated three-dimensional model being a three-dimensional model obtained by integrating the surrounding environment model and the manipulator model;

a model image generator to generate a model image being an image of the integrated three-dimensional model viewed from a viewpoint designated by the operator; and a model image display device to display the model image and configure to be able to be viewed by the operator switching between the stereoscopic display device and the model image display device through moving the head of the operator.

2. A remote control manipulator system comprising:

a manipulator controlled by an operator remotely to handle an object;

an operation instruction inputter through which the operator inputs an operation instruction instructing an operation of the manipulator to move or to be still;

a control signal generator to generate a control signal controlling the manipulator from the operation instruction;

a right camera and a left camera mounted on the manipulator, the right camera and the left camera having a predetermined positional relationship;

a stereoscopic display device to display a right-eye image captured by the right camera and a left-eye image captured by the left camera to be viewed stereoscopically;

a position and posture sensor to detect position and posture information representing a position and a posture of the manipulator;

a ranging sensor being mounted on the manipulator and to measure ranging data including distances and directions to the object and a surrounding environment being a thing being present around the object;

a structure data storage to store manipulator structure data representing a structure of the manipulator, camera structure data representing structures of the right camera and the left camera, and ranging sensor structure data representing a structure of the ranging sensor;

a manipulator model generator to generate a manipulator model being a three-dimensional model of the manipulator including the right camera, the left camera, and the ranging sensor by referring to the manipulator structure data, the camera structure data, the ranging sensor structure data, and the position and posture information;

an image processing model generator to perform image processing on the right-eye image and the left-eye image based on positions and capturing directions of the right camera and the left camera included in the manipulator model to generate a surrounding environment model being a three-dimensional model of the surrounding environment;

a ranging data processing model generator to process the ranging data to generate the surrounding environment model based on a position and a ranging direction of the ranging sensor included in the manipulator model;

a model integrator to generate an integrated three-dimensional model being a three-dimensional model obtained by integrating the manipulator model and at least one of a camera surrounding environment model and a sensor surrounding environment model, the camera surrounding environment model being the surrounding environment model generated by the image processing model generator, the sensor surrounding environment model being the surrounding environment model generated by the ranging data processing model generator;

a model image generator to generate a model image being an image of the integrated three-dimensional model viewed from a viewpoint designated by the operator; and a model image display device to display the model image and configure to be able to be viewed by the operator switching between the stereoscopic display device and the model image display device through moving the head of the operator.

3. The remote control manipulator system according to claim 2, wherein the model integrator selects one of the camera surrounding environment model and the sensor surrounding environment model to generate the integrated three-dimensional model.

4. The remote control manipulator system according to claim 2, wherein the model integrator selects both the camera surrounding environment model and the sensor surrounding environment model to generate the integrated three-dimensional model.

5. The remote control manipulator system according to claim 2, wherein the model integrator selects both the camera surrounding environment model and the sensor surrounding environment model or one of the camera surrounding environment model and the sensor surrounding environment model by an instruction of the operator to generate the integrated three-dimensional model.

6. The remote control manipulator system according to claim 2, further comprising a surrounding environment model merger to generate a merged surrounding environment model being the surrounding environment model obtained by merging the camera surrounding environment model and the sensor surrounding environment model, wherein the model integrator integrates the merged surrounding environment model and the manipulator model to generate the integrated three-dimensional model.

7. The remote control manipulator system according to claim 6, wherein the model integrator generates the integrated three-dimensional model by selecting both the camera surrounding environment model and the sensor surrounding environment model or any one of the camera surrounding environment model, the sensor surrounding environment model, and the merged surrounding environment model by an instruction of the operator.

8. A remote control manipulator system comprising:

a manipulator controlled remotely by an operator to handle an object;

an operation instruction inputter through which the operator inputs an operation instruction instructing an operation of the manipulator to move or to be still;

a control signal generator to generate a control signal controlling the manipulator from the operation instruction;

a right camera and a left camera mounted on the manipulator, the right camera and the left camera having a predetermined positional relationship;
a stereoscopic display device to display a right-eye image captured by the right camera and a left-eye image captured by the left camera to be viewed stereoscopically;
a ranging sensor being mounted on the manipulator and to measure ranging data including distances and directions to the object and a surrounding environment being a thing being present around the object;
a position and posture sensor to detect position and posture information representing a position and a posture of the manipulator;
a structure data storage to store manipulator structure data representing a structure of the manipulator and ranging sensor structure data representing a structure of the ranging sensor;
a manipulator model generator to generate a manipulator model being a three-dimensional model of the manipulator including the ranging sensor by referring to the manipulator structure data, the ranging sensor structure data, and the position and posture information;
a ranging data processing model generator to process the ranging data to generate a surrounding environment model being a three-dimensional model of the surrounding environment by referring to a position and a ranging direction of the ranging sensor included in the manipulator model;
a model integrator to generate an integrated three-dimensional model being a three-dimensional model obtained by integrating the surrounding environment model and the manipulator model;
a model image generator to generate a model image being an image of the integrated three-dimensional model viewed from a viewpoint designated by the operator; and
a model image display device to display the model image and configure to be able to be viewed by the operator switching between the stereoscopic display device and the model image display device through moving the head of the operator.

9. The remote control manipulator system according to claim 2, further comprising a plurality of the ranging sensors,
wherein the ranging data processing model generator generates the surrounding environment model by processing a plurality of the ranging data measured by the plurality of ranging sensors.

10. The remote control manipulator system according to claim 2, wherein the ranging data processing model generator generates the surrounding environment model by processing each of a plurality of ranging data, the ranging data included in the plurality of ranging data being measured when at least one of the position and a posture of the ranging sensor is different, based on the position and the ranging direction of the ranging sensor included in the manipulator model generated from the position and posture information when the ranging data is measured.

11. The remote control manipulator system according to claim 1, wherein the image processing model generator generates the surrounding environment model by performing image processing on each set of a plurality of sets of the right-eye image and the left-eye image, the set of the right-eye image and the left-eye image included in the plurality of sets of the right-eye image and the left-eye image being captured when at least one of the position and a posture of at least one of the right camera and the left camera is different, based on the positions and capturing directions of the right camera and the left camera included in the manipulator model generated from the position and posture information when the set of the right-eye image and the left-eye image are captured.

12. The remote control manipulator system according to claim 1, wherein the model image generator generates a plurality of the model images, each of the plurality of the model images being generated by viewing the integrated three-dimensional model from each of a plurality of different viewpoints, and
the model image display device displays simultaneously the plurality of the model images.

13. The remote control manipulator system according to claim 1, further comprising a target manipulator model generator to generate a target manipulator model being the manipulator model to be taken after execution of the operation according to the operation instruction by referring to a target posture representing the position and the posture of the manipulator to be taken after execution of the operation according to the operation instruction,
wherein the model integrator generates the integrated three-dimensional model by selecting one or both of the manipulator model and the target manipulator model according to an instruction of the operator.

14. A remote control assistance system comprising:
a stereoscopic display device to display a right-eye image and a left-eye image captured by a right camera and a left camera to be viewed stereoscopically, the right camera and the left camera being mounted on a manipulator controlled by an operator remotely to handle an object and having a predetermined positional relationship;
a structure data storage to store manipulator structure data representing a structure of the manipulator and camera structure data representing structures of the right camera and the left camera;
a manipulator model generator to generate a manipulator model being a three-dimensional model of the manipulator including the right camera and the left camera by referring to the manipulator structure data, the camera structure data, and position and posture information representing a position and a posture of the manipulator;
an image processing model generator to perform image processing on the right-eye image and the left-eye image based on positions and capturing directions of the right camera and the left camera included in the manipulator model to generate a surrounding environment model being a three-dimensional model of the object and a surrounding environment being a thing being present around the object;
a model integrator to generate an integrated three-dimensional model being a three-dimensional model obtained by integrating the surrounding environment model and the manipulator model;
a model image generator to generate a model image being an image of the integrated three-dimensional model viewed from a viewpoint designated by the operator; and
a model image display device to display the model image and configure to be able to be viewed by the operator switching between the stereoscopic display device and the model image display device through moving the head of the operator.

15. A remote control assistance system comprising:
- a stereoscopic display device to display a right-eye image captured by a right camera and a left-eye image captured by a left camera to be viewed stereoscopically, the right camera and the left camera being mounted on a manipulator controlled by an operator remotely to handle an object, and having a predetermined positional relationship;
- a ranging sensor being mounted on the manipulator and to measure ranging data including distances and directions to the object and a surrounding environment being a thing being present around the object;
- a structure data storage to store manipulator structure data representing a structure of the manipulator, camera structure data representing structures of the right camera and the left camera, and ranging sensor structure data representing a structure of the ranging sensor;
- a manipulator model generator to generate a manipulator model being a three-dimensional model of the manipulator including the right camera, the left camera, and the ranging sensor by referring to the manipulator structure data, the camera structure data, the ranging sensor structure data, and position and posture information representing a position and a posture of the manipulator;
- an image processing model generator to perform image processing on the right-eye image and the left-eye image based on positions and capturing directions of the right camera and the left camera included in the manipulator model to generate a surrounding environment model being a three-dimensional model of the surrounding environment;
- a ranging data processing model generator to process the ranging data to generate the surrounding environment model based on a position and a ranging direction of the ranging sensor included in the manipulator model;
- a model integrator to generate an integrated three-dimensional model being a three-dimensional model obtained by integrating the manipulator model and at least one of a camera surrounding environment model and a sensor surrounding environment model, the camera surrounding environment model being the surrounding environment model generated by the image processing model generator, the sensor surrounding environment model being the surrounding environment model generated by the ranging data processing model generator;
- a model image generator to generate a model image being an image of the integrated three-dimensional model viewed from a viewpoint designated by the operator; and
- a model image display device to display the model image and configure to be able to be viewed by the operator switching between the stereoscopic display device and the model image display device through moving the head of the operator.

16. The remote control assistance system according to claim 15, wherein the model integrator selects one of the camera surrounding environment model and the sensor surrounding environment model to generate the integrated three-dimensional model.

17. The remote control assistance system according to claim 15, wherein the model integrator selects both the camera surrounding environment model and the sensor surrounding environment model to generate the integrated three-dimensional model.

18. The remote control assistance system according to claim 15, wherein the model integrator selects both the camera surrounding environment model and the sensor surrounding environment model or one of the camera surrounding environment model and the sensor surrounding environment model by an instruction of the operator to generate the integrated three-dimensional model.

19. The remote control assistance system according to claim 15, further comprising a surrounding environment model merger to generate a merged surrounding environment model being the surrounding environment model obtained by merging the camera surrounding environment model and the sensor surrounding environment model,
- wherein the model integrator integrates the merged surrounding environment model and the manipulator model to generate the integrated three-dimensional model.

20. The remote control assistance system according to claim 19, wherein the model integrator generates the integrated three-dimensional model by selecting both the camera surrounding environment model and the sensor surrounding environment model or any one of the camera surrounding environment model, the sensor surrounding environment model, and the merged surrounding environment model by an instruction of the operator.

21. A remote control assistance system comprising:
- a stereoscopic display device to display a right-eye image captured by a right camera and a left-eye image captured by a left camera to be viewed stereoscopically, the right camera and the left camera being mounted on a manipulator controlled by an operator remotely to handle an object, and having a predetermined positional relationship;
- a ranging sensor being mounted on the manipulator and to measure ranging data including distances and directions to the object and a surrounding environment being a thing being present around the object;
- a structure data storage to store manipulator structure data representing a structure of the manipulator and ranging sensor structure data representing a structure of the ranging sensor;
- a manipulator model generator to generate a manipulator model being a three-dimensional model of the manipulator including the ranging sensor by referring to the manipulator structure data, the ranging sensor structure data, and position and posture information representing a position and a posture of the manipulator;
- a ranging data processing model generator to process the ranging data to generate a surrounding environment model being a three-dimensional model of the surrounding environment based on a position and a ranging direction of the ranging sensor included in the manipulator model;
- a model integrator to generate an integrated three-dimensional model being a three-dimensional model obtained by integrating the surrounding environment model and the manipulator model;
- a model image generator to generate a model image being an image of the integrated three-dimensional model viewed from a viewpoint designated by the operator; and
- a model image display device to display the model image and configure to be able to be viewed by the operator switching between the stereoscopic display device and the model image display device through moving the head of the operator.

22. The remote control assistance system according to claim 15, further comprising a plurality of the ranging sensors, wherein the ranging data processing model generator generates the surrounding environment model by processing a plurality of the ranging data measured by the plurality of ranging sensors.

23. The remote control assistance system according to claim 15, wherein the ranging data processing model generator generates the surrounding environment model by processing each of a plurality of ranging data, the ranging data included in the plurality of ranging data being measured when at least one of the position and a posture of the ranging sensor is different, based on the position and the ranging direction of the ranging sensor included in the manipulator model generated from the position and posture information when the ranging data is measured.

24. The remote control assistance system according to claim 14, wherein the image processing model generator generates the surrounding environment model by performing image processing on each set of a plurality of sets of the right-eye image and the left-eye image, the set of the right-eye image and the left-eye image included in the plurality of sets of the right-eye image and the left-eye image being captured when at least one of the position and a posture of at least one of the right camera and the left camera is different based on the positions and capturing directions of the right camera and the left camera included in the manipulator model generated from the position and posture information when the set of the right-eye image and the left-eye image are captured.

25. The remote control assistance system according to claim 14, wherein the model image generator generates a plurality of the model images, each of the plurality of the model images being generated by viewing the integrated three-dimensional model from each of a plurality of different viewpoints, and the model image display device displays simultaneously the plurality of model images.

26. The remote control assistance system according to claim 14, further comprising a target manipulator model generator to generate a target manipulator model being the manipulator model to be taken after execution of an operation according to the operation instruction by referring to a target posture representing the position and the posture of the manipulator to be taken after execution of the operation according to the operation instruction instructing the operation of the manipulator to move or to be still, wherein the model integrator generates the integrated three-dimensional model by selecting one or both of the manipulator model and the target manipulator model according to an instruction of the operator.

27. The remote control assistance system according to claim 14, further comprising the right camera and the left camera.

* * * * *